United States Patent
Takahashi et al.

(10) Patent No.: US 10,002,417 B2
(45) Date of Patent: Jun. 19, 2018

(54) READY FOR ROTATION STATE DETECTION DEVICE, METHOD OF DETECTING READY FOR ROTATION STATE AND SUBSTRATE PROCESSING APPARATUS

(71) Applicant: Tokyo Electron Limited, Tokyo (JP)

(72) Inventors: Kiichi Takahashi, Iwate (JP); Takeshi Kobayashi, Iwate (JP); Yuji Takabatake, Iwate (JP); Naohide Ito, Iwate (JP); Katsuaki Sugawara, Iwate (JP)

(73) Assignee: TOKYO ELECTRON LIMITED, Tokyo (JP)

( * ) Notice: Subject to any disclaimer, the term of this patent is extended or adjusted under 35 U.S.C. 154(b) by 286 days.

(21) Appl. No.: 14/281,989

(22) Filed: May 20, 2014

(65) Prior Publication Data
US 2014/0347465 A1     Nov. 27, 2014

(30) Foreign Application Priority Data
May 27, 2013   (JP) ................... 2013-110869

(51) Int. Cl.
*G01C 5/00* (2006.01)
*G06T 7/00* (2017.01)
*H04N 7/18* (2006.01)

(52) U.S. Cl.
CPC .. *G06T 7/0004* (2013.01); *G06T 2207/30148* (2013.01)

(58) Field of Classification Search
CPC .......... G01C 5/00; H04N 7/18; G06T 7/0004; G06T 2207/30148
USPC .................................................. 348/87
See application file for complete search history.

(56) References Cited

U.S. PATENT DOCUMENTS

| | | | |
|---|---|---|---|
| 2001/0051837 A1* | 12/2001 | Tateyama | G05B 19/41865 700/112 |
| 2005/0196094 A1* | 9/2005 | Glebov | G02B 6/43 385/14 |
| 2009/0181226 A1* | 7/2009 | Ning | H05K 3/1258 428/209 |
| 2010/0314798 A1* | 12/2010 | Kawakami | B82Y 10/00 264/293 |
| 2012/0146191 A1* | 6/2012 | Yasuhara | C23C 16/303 257/615 |

(Continued)

FOREIGN PATENT DOCUMENTS

| | | |
|---|---|---|
| JP | 10-294287 | 11/1998 |
| JP | H10-321705 | 12/1998 |

(Continued)

*Primary Examiner* — Andy Rao
*Assistant Examiner* — Zaihan Jiang
(74) *Attorney, Agent, or Firm* — IPUSA, PLLC

(57) ABSTRACT

A ready for rotation state detection device is configured to detect a state in which a substrate, which is placed on a concave portion formed in a surface of a turntable, will not fly out of the concave portion when the turntable is rotated in a chamber. The ready for rotation state detection device includes a ready for rotation state detection unit configured to detect that a height of a surface of an end of the substrate is equal to or lower than a predetermined value indicating that the turntable is rotatable, upon receiving the substrate on the concave portion.

15 Claims, 18 Drawing Sheets

(56) References Cited

U.S. PATENT DOCUMENTS

2013/0019927 A1* 1/2013 Zimmerman ....... H01L 31/0725
136/252
2013/0092595 A1* 4/2013 Chang ..................... H01L 22/12
206/710

FOREIGN PATENT DOCUMENTS

| JP | 2001-511532 | | 8/2001 |
|----|-------------|---|--------|
| JP | 2004-119673 | * | 4/2004 |
| JP | 2008-300394 | | 12/2008 |
| JP | 2009-156672 | | 7/2009 |
| JP | 2010-027881 | | 2/2010 |
| JP | 2012-094814 | | 5/2012 |
| WO | 99/05703 | | 2/1999 |

* cited by examiner

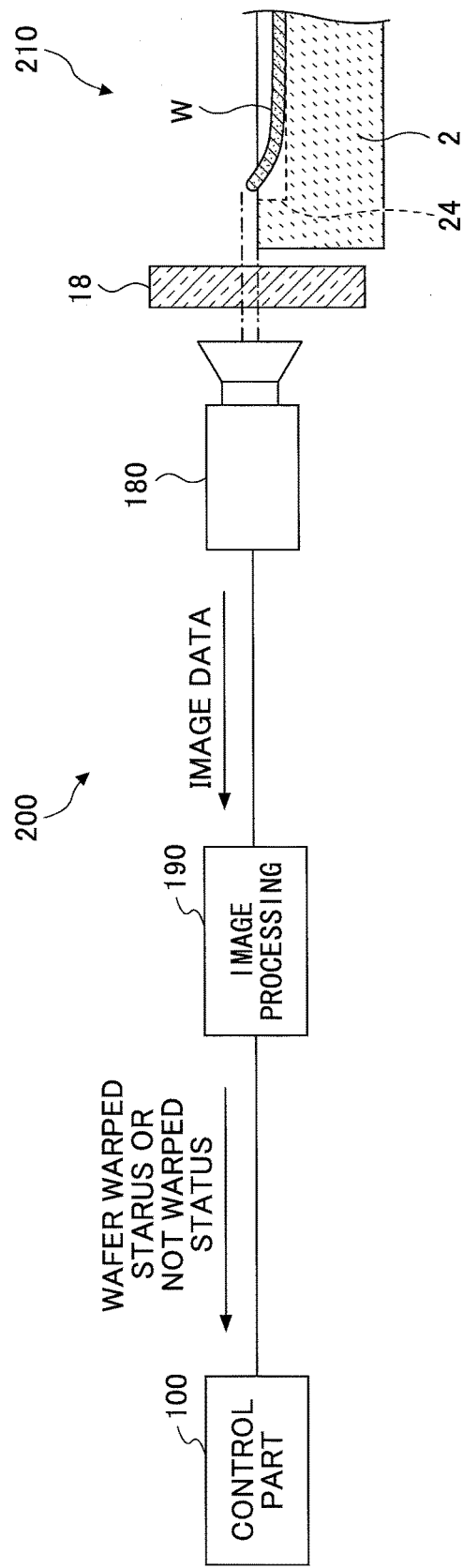

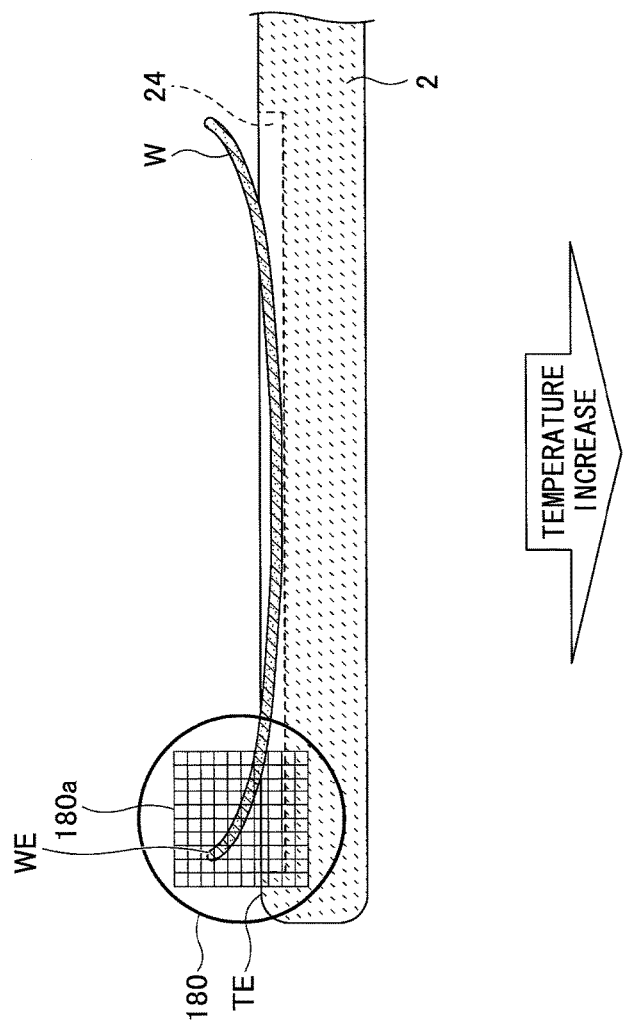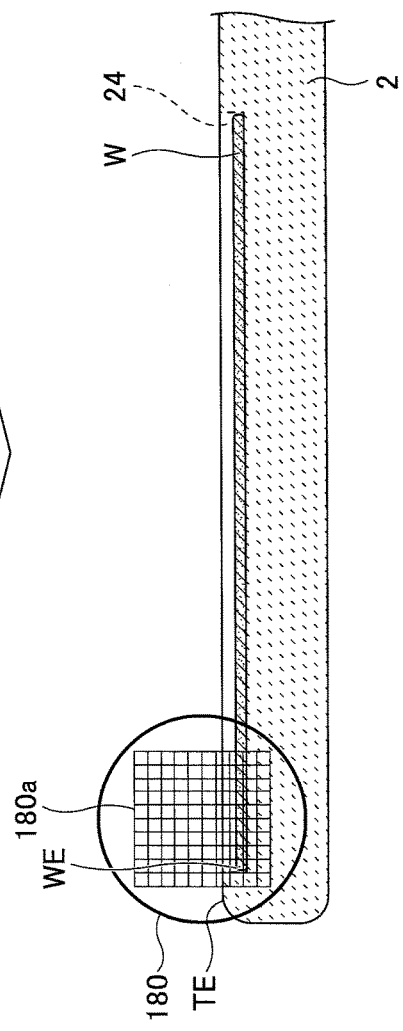

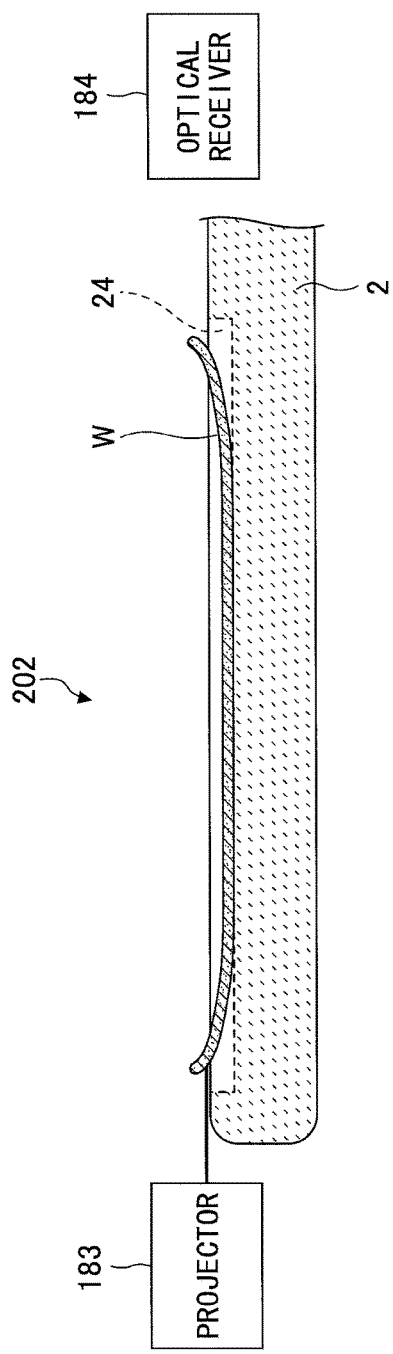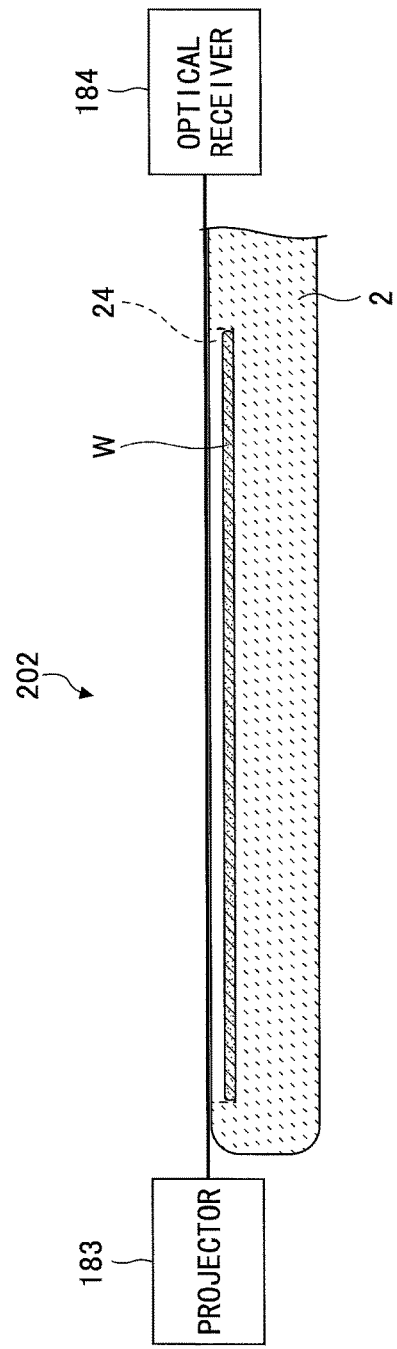

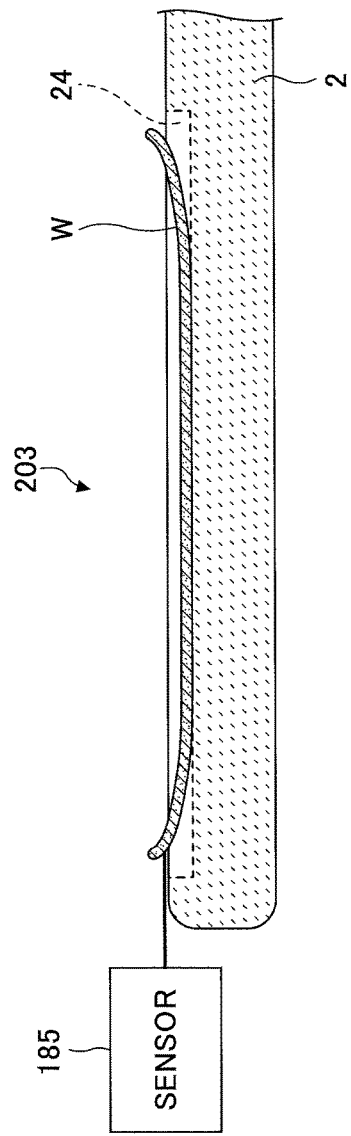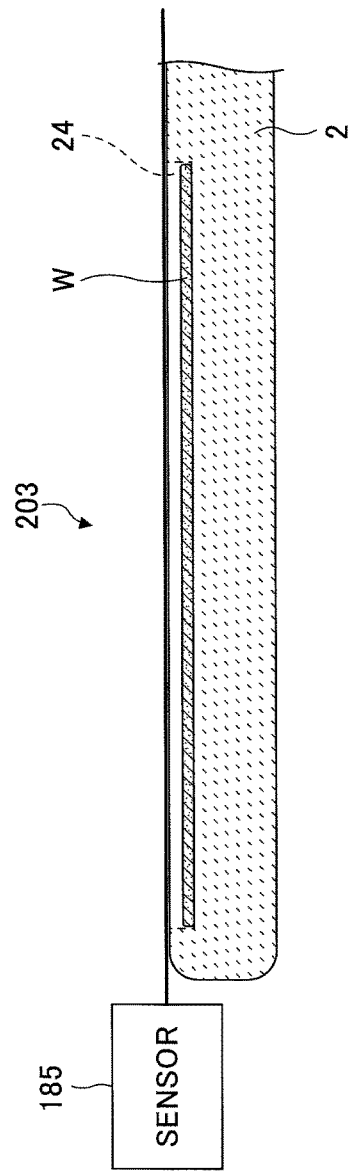

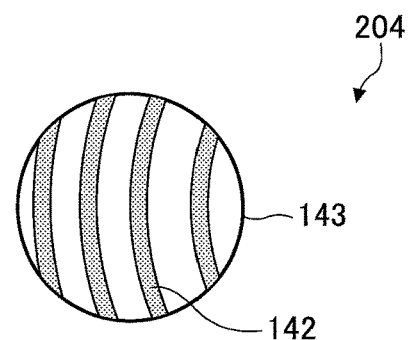
FIG.17A
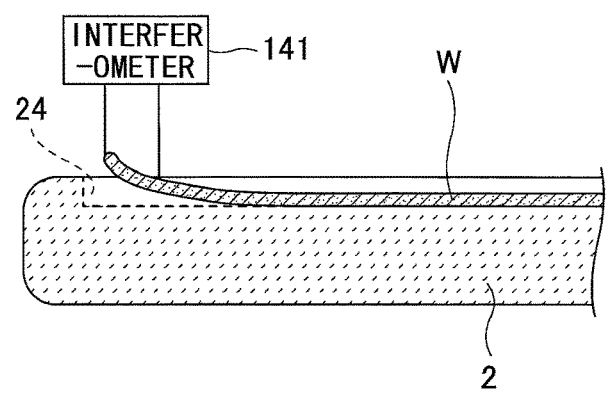
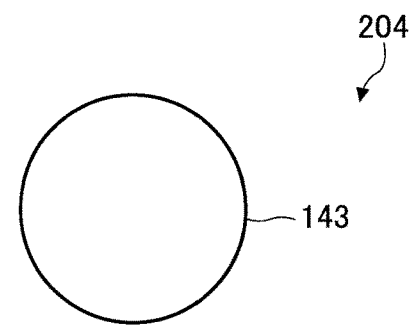
FIG.17B
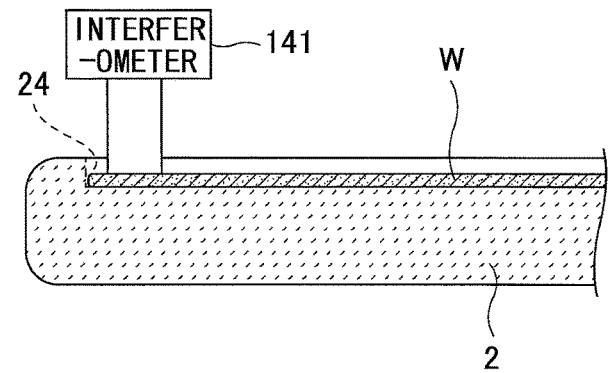

READY FOR ROTATION STATE DETECTION DEVICE, METHOD OF DETECTING READY FOR ROTATION STATE AND SUBSTRATE PROCESSING APPARATUS

CROSS-REFERENCE TO RELATED APPLICATIONS

This patent application is based upon and claims the benefit of priority of Japanese Patent Application No. 2013-110869, filed on May 27, 2013, the entire contents of which are incorporated herein by reference.

BACKGROUND OF THE INVENTION

1. Field of the Invention

The present invention relates to a ready for rotation state detection device, a method of detecting a ready for rotation state and a substrate processing apparatus.

2. Description of the Related Art

When a wafer is transferred into a processing chamber of a single wafer processing epitaxial growth apparatus, the wafer warps because a temperature surrounding the wafer rapidly changes from room temperature to 500 degrees C. or more. Such a warpage of the wafer subsides when the temperature of the wafer increases and reaches a temperature close to the surrounding's high-temperature environment. However, because the wafer behaves in a way that warps once and then decreases its warpage, when the wafer is placed on a susceptor with the warpage, a back side edge of the wafer may scratch the susceptor when the warpage decreases, which may generate dust.

Accordingly, as disclosed in Japanese Laid-Open Patent Application Publication No. 10-294287, an epitaxial growth apparatus is known that relays and supports a wafer by lift pins before transferring the wafer onto a susceptor while monitoring a warpage in the neighborhood of the center of the wafer by a CCD (Charge Coupled Device) camera, and transfers the wafer on the susceptor after the warpage of the wafer subsides by heating the wafer.

The invention disclosed in Japanese Laid-Open Patent Application Publication No. 10-294287 can prevent the wafer from performing a recovery action from the warped state on the susceptor, which can reduce contact between the backside edge of the wafer and the susceptor that is caused during the recovery action of the wafer from the warped state, and can prevent the backside edge of the wafer from being damaged.

However, in the configuration disclosed in Japanese Laid-Open Patent Application Publication No. 10-294287, because the recovery of the wafer from the warped state is determined depending on whether a shape of the wafer on the lift pins has become the same as a shape of the wafer when the wafer does not warp, transferring the wafer has to be started after the warpage of the wafer almost completely subsides, which takes a long time for transferring the wafer.

In the meantime, in a turntable-type substrate processing apparatus using a turntable, in general, there is a concave portion like a pocket (a depression) to fix a wafer provided in a surface of the turntable. Hence, when the wafer fits in the concave portion and the wafer is expected not to fly out when the turntable is rotated, a bit of remaining warpage does not harm the substrate process in most cases. Moreover, it is preferable for the substrate process to start as soon as possible after processing the substrate is ready to start to improve the throughput.

SUMMARY OF THE INVENTION

Embodiments of the present invention provide a novel and useful ready for rotation state detection device, a method of detecting a ready for rotation state and a substrate processing apparatus solving one or more of the problems discussed above.

More specifically, the embodiments of the present invention may provide a ready for rotation state detection device, a method of detecting a ready for rotation state and a substrate processing apparatus that can detect a state ready to rotate a turntable that does not cause a substrate to fly out even if the turntable is rotated.

According to one embodiment of the present invention, there is provided a ready for rotation state detection device configured to detect a state in which a substrate, which is placed on a concave portion formed in a surface of a turntable, will not fly out of the concave portion when the turntable is rotated in a chamber. The ready for rotation state detection device includes a ready for rotation state detection unit configured to detect that a height of a surface of an end of the substrate is equal to or lower than a predetermined value indicating that the turntable is ready to start rotating, upon receiving the substrate on the concave portion.

According to another embodiment of the present invention, there is provided a method of detecting a ready for rotation state to detect a state in which a substrate, which is placed on a concave portion formed in a surface of a turntable, will not fly out of the concave portion when the turntable is rotated in a chamber. In the method, it is detected that a height of a surface of an end of the substrate is equal to or lower than a predetermined value indicating that the turntable is ready to start rotating, upon receiving the substrate on the concave portion.

Additional objects and advantages of the embodiments are set forth in part in the description which follows, and in part will become obvious from the description, or may be learned by practice of the invention. The objects and advantages of the invention will be realized and attained by means of the elements and combinations particularly pointed out in the appended claims. It is to be understood that both the foregoing general description and the following detailed description are exemplary and explanatory and are not restrictive of the invention as claimed.

BRIEF DESCRIPTION OF THE DRAWINGS

FIG. 7 is a drawing illustrating an example of the ready for rotation state detection device according to the first embodiment of the present invention;

FIGS. 8A and 8B are drawings illustrating examples of images shot by the ready for rotation state detection device according to the first embodiment of the present invention;

FIGS. 15A and 15B are drawings illustrating an example of a ready for rotation state detection device according to a third embodiment of the present invention;

FIGS. 16A and 16B are drawings illustrating an example of a ready for rotation state detection device according to a fourth embodiment of the present invention; and FIGS. 17A and 17B are drawings illustrating an example of a ready for rotation state detection device according to a fifth embodiment of the present invention.

DETAILED DESCRIPTION OF THE PREFERRED EMBODIMENTS

A description is given below of embodiments of the present invention, with reference to accompanying drawings.

[First Embodiment]

Figure 1:
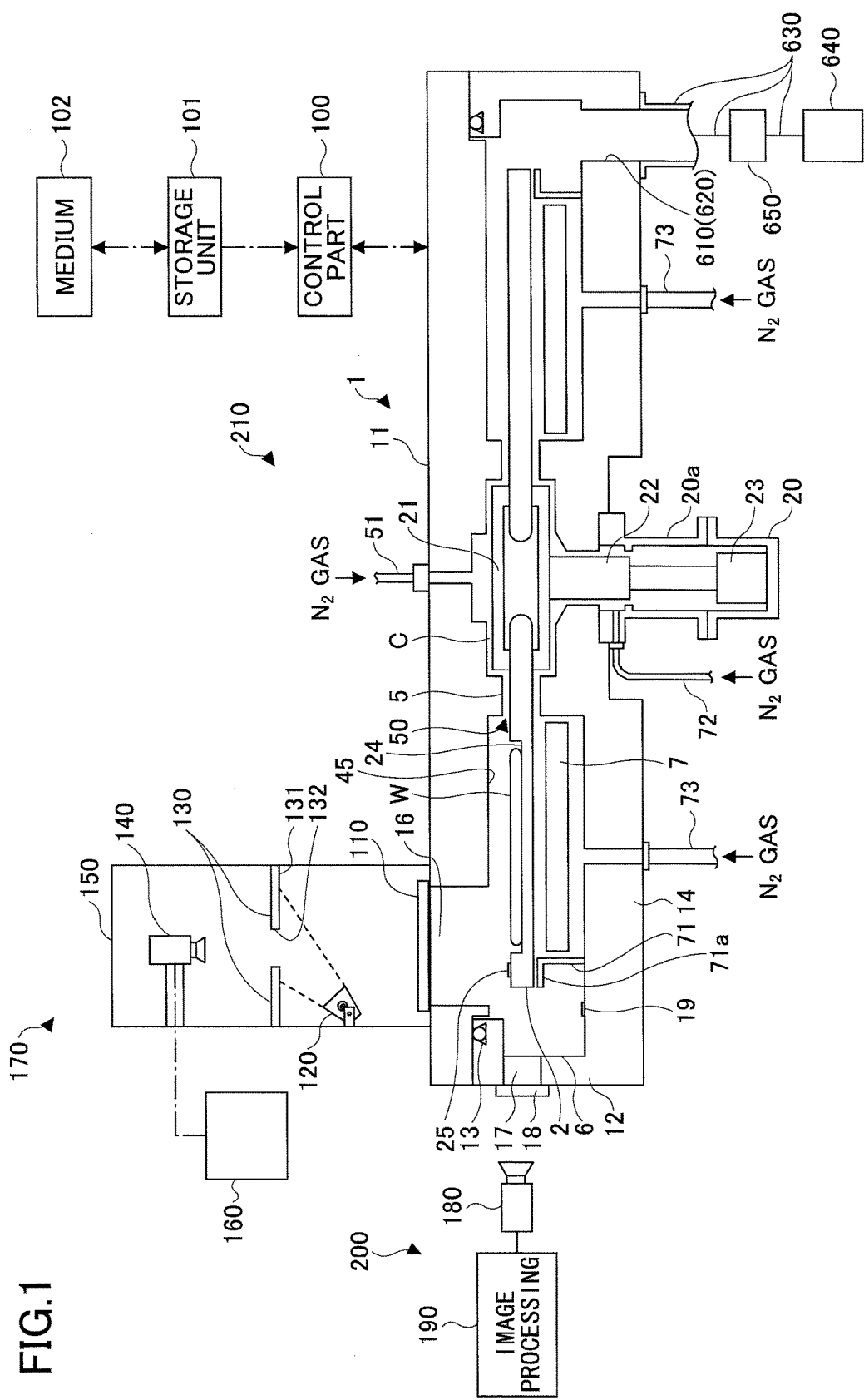
FIG. 1 is a cross-sectional view illustrating an example of a substrate processing apparatus including a ready for rotation state detection device according to a first embodiment of the present invention.

FIG. 1 is a cross-sectional view of a substrate processing apparatus including a ready for rotation state detection device according to a first embodiment of the present invention. In FIG. 1, the ready for rotation state detection device 200 of the first embodiment includes a camera 180 and an image processing part 190. Moreover, the substrate processing apparatus 210 of the first embodiment includes a chamber 1, a turntable 2, a window 18, a rotational axis 22, a concave portion 24, a control part 100, and a substrate position detecting device 170 as major components in addition to the ready for rotation state detection device 200. In addition to the above components, the substrate processing apparatus 210 may include a variety of components necessary for processing a substrate inside and attached to the chamber 1 depending on the necessity. Furthermore, FIG. 1 illustrates a wafer W that is a ready for rotation state detection object.

The substrate processing apparatus 210 of the first embodiment of the present invention includes a vacuum chamber 1 whose planar shape is approximately round in shape, and a turntable 2 provided in the vacuum chamber 1 having a center of rotation that coincides with the center of the vacuum chamber 1.

The vacuum chamber 1 includes a ceiling plate 11 and a chamber body 12. The ceiling plate 11 is configured to be detachable from the chamber body 12. The ceiling plate 11 is pressed to the chamber body 12 through a sealing member, for example, an O-ring 13, due to a decompression state inside the chamber 1, which causes the chamber 1 to be sealed hermetically. On the other hand, when detaching the ceiling plate 11 from the chamber body 12 is needed, a driving mechanism not shown in the drawing lifts the ceiling plate 11 upward.

The turntable 2 is fixed to a core portion 21 having a cylindrical shape at the center portion, and the core portion 21 is fixed to an upper end of a rotational shaft 22 that extends in a vertical direction. The rotational shaft 22 penetrates through a bottom part 14 of the vacuum chamber 1, and the lower end of the rotational shaft 22 is attached to a drive part 23. The drive part 23 allows the rotational shaft 22 and the turntable 2 to rotate around the vertical axis in a clockwise direction in this example. The rotational shaft 22 and the drive part 23 are housed in a cylindrical case body 20 whose upper surface is open. This case body 20 is hermetically attached to a lower surface of the bottom part 14 of the vacuum chamber 1 through a flange part 20a provided on an upper surface of the case body 20, by which the internal atmosphere of the case body 20 is separated from the external atmosphere.

The chamber 1 is a processing chamber to process a substrate such as a wafer W and the like. Any substrate processing chamber that performs a substrate process by using the turntable 2 can be applied to the chamber 1 that can be used for the ready for rotation state detection device 200 of the present embodiment, and a substance of the substrate process performed in the chamber 1 does not limit the chamber 1. Accordingly, the substrate processing apparatus 200 can be configured to be an apparatus that performs a variety of substrate processes. However, in the first embodiment, a description is given below of an example of the chamber 1 formed as a film deposition chamber to perform a film deposition process for convenience of explanation. In addition, when the film deposition process is performed by using the chamber 1, in general, the inside of the chamber 1 is kept a high temperature, and a reaction gas for film deposition is supplied into the chamber 1. In the substrate processing apparatus 200 of the present embodiment, a description is given below of an example of performing a film deposition process by utilizing an ALD (Atomic Layer Deposition) method that forms anatomic layer on a surface of the wafer W or MLD (Molecular Layer Deposition) method that forms a molecular layer on the surface of the wafer W.

The chamber 1 is configured to be an airtight container to process the wafer W. As illustrated in FIG. 1, the chamber 1 may be constituted of the ceiling plate 11 and the chamber body 12, and may constitute the airtight container as a whole. In the substrate processing apparatus 200, an opening 17 is provided in a part of a side wall to allow the camera 180 to take an image of the inside of the chamber 1. Moreover, the window 18 is provided so as to close the opening 17. In other words, the camera 180 is configured to be able to image the inside of the chamber 1 through the window 18.

The turntable 2 is a substrate placement holder to receive a substrate, and is provided in the chamber 1. The concave portion 24 having an almost same size as the wafer and a depressed shape, is formed as a substrate receiving area in a surface of the turntable 2, and is configured to allow the wafer W to be placed on a predetermined location. Furthermore, the turntable 2 is formed into a circular disk shape, and is configured to be able to receive a plurality of wafers W along a circumferential direction. The turntable 2 is coupled to the rotational axis 22, and is configured to be rotatable. The turntable 2 may be also called a susceptor 2.

The depth of the concave portion 24 formed in the surface of the turntable 2 may be the same as a thickness of the wafer W, or may be deeper than the thickness of the wafer W. Making the depth of the concave portion 24 too deep is not practical because transferring the wafer W into/from the concave portion 24 becomes difficult, but, for example, the concave portion 24 may be made to the extent of about twice or three times as deep as the thickness of the wafer W. This can reduce the time to wait for the warpage of the wafer W to subside. FIG. 1 gives an example in which the thickness of the wafer W and the depth of the concave portion 24 are set at approximately the same.

The opening 17 and the window 18 are provided at a height that allows the external camera 180 to take an image of the surface of the turntable 2. The camera 180 takes an image of a neighborhood of the surface of the turntable 2 from a lateral side and of an amount of protrusion of the wafer W from the concave portion 24. More specifically, because the inside of the chamber 1 is kept at a high temperature of about 300 to 650 degrees C. in the substrate processing apparatus 210 when the film deposition process is performed, the wafer W warps when the wafer W having been in a room temperature is transferred into the chamber 1 due to the rapid temperature change. The warpage of the wafer W subsides as the temperature of the wafer W increases and becomes closer to the same temperature as that of the surrounding environment, and how much the warpage of the wafer W has to be reduced to start to rotate the turntable 2 can be determined by how much the wafer W goes in the concave portion 24 of the turntable 2. In other words, when the highest location in the wafer edge is lower than the surface of the turntable 2 at the edge of the concave portion 24, the edge wall of the concave portion 24 can resist against a centrifugal force acting on the wafer W even if the turntable 2 is rotated, and the turntable 2 can be rotated while holding the wafer W in the concave portion 24. In contrast, when the wafer edge greatly protrudes from the concave portion 24 in a height direction and the lower end of the wafer W is located higher than the surface of the turntable 2, because there is no member resisting against the centrifugal force acting on the wafer W when the turntable 2 is rotated, the wafer W flies out of the concave portion 24 by the centrifugal force and crushes against the inner wall of the chamber 1.

Therefore, in the ready for rotation state detection device 200 and the substrate processing apparatus 210 of the present embodiment, the opening 17 is formed in an area of the chamber body 12 including a location as high as the surface of the turntable 2 to allow the wafer W placed in the concave portion 24 to be observed from the lateral side. Moreover, while the inside of the chamber 1 is sealed by providing the window 18 to cover the opening 17, the camera 180 is provided outside the chamber 1 so as to take an image of the amount of protrusion of the wafer W from the concave portion 24.

Here, the opening 17 may be formed by hollowing out a part of the side wall of the chamber body 12.

Furthermore, the window 18 may be made of a variety of materials that transmits light, and for example, the window 18 is configured as a quartz window 18 made of quartz glass. The window 18 may be provided so as to cover the opening 17 from the outside of the chamber body 12, or may be provided to fit in a groove by forming the groove in an inner wall of the opening 17 at any location in a thickness direction of the opening 17 (or the chamber body 12). The window 18 may be provided in a variety of forms as long as the window 18 allows the inside of the chamber 1 to be visually recognized from the outside while sealing the chamber 1.

The camera 180 and the image processing part 190 function as a ready for rotation state detection unit to detect a state ready for rotation, and constitute the ready for rotation state detection device 200.

A variety of cameras is available for the camera 180 as long as the camera 180 can take an image of the inside of the chamber 1, and for example, a CCD camera, a CMOS (Complementary Metal Oxide Semiconductor) camera and the like are available.

The image processing part 190 is a determination unit that processes the image taken by the camera 180, and determines whether the wafer W is in a state allowing the turntable 2 to start rotating by calculating the height of the wafer edge. More specifically, for example, the image processing part 190 detects an edge from the image data taken by the camera 180, and compares the edge of the wafer W with the height of the edge of the concave portion 24. When the height of the wafer edge is lower than the edge of the concave portion 24 or in a predetermined range even if higher than the edge of the concave portion 24, it is determined that the turntable 2 is in a state ready to rotate. In this manner, the image processing part 190 determines whether the turntable 2 is in the ready for rotation state while performing the image processing. Here, determination results determined by the image processing part 190 are sent to the control part 100, and the control part 100 controls whether to start rotating the turntable 2 based on the determination results received from the image processing part 190, or to keep waiting without rotating the turntable 2.

In this way, the image processing part 190 is a unit to perform arithmetic processing to detect whether the height of the surface of the wafer edge is equal to or lower than a predetermined value and the turntable 2 is in the ready for rotation state based on the image data taken by the camera 180. Hence, the image processing part 190 is configured to be able to perform the arithmetic processing, and for example, may be configured as a microcomputer that includes a CPU (Central Processing Unit) and operates by running a program, or as an integrated circuit such as an ASIC (Application Specific Integrated Circuit) that is designed and produced for a specific purpose and the like.

According to the ready for rotation state detection device 200 and the substrate processing apparatus 210 of the present embodiment, the camera 180 that can take an image of the neighborhood of the edge of the concave portion 24 of the turntable 2 is provided, and the amount of protrusion of the wafer W from the concave portion 24 in the height direction is obtained from the image taken by the camera 180, based on which whether the turntable 2 is in the ready for rotation state is determined. Accordingly, there is no need to wait for the warpage of the wafer W to disappear more than necessary, which can improve the throughput while certainly preventing the wafer from flying out.

Here, because the window 18 and the camera 180 are provided in a predetermined location in the chamber 1, the degree of the warpage of the wafer W has to be detected by moving the concave portion 24 to a location possible to be imaged from the window 18 and the camera 180. In other words, because the turntable 2 is rotatable, a position of the wafer W placed on the turntable 2 is not fixed, and the position of the wafer W has to be detected in detecting the ready for rotation state of each wafer W. Accordingly, the substrate processing apparatus 210 preferably includes the substrate position detecting device 170.

The substrate position detecting device 170 is a device to detect a position of the wafer W placed on the turntable 2, and is provided attached to the ceiling surface 11. The substrate position detecting device 170 includes a window 110, an illumination 120, an illumination reflecting plate 130, a camera 140, a housing 150, and a processing part 160. There is an opening 16 provided in the ceiling plate 11 to allow the camera 140 to take an image of the inside of the chamber 1, and the substrate position detecting device 170 is provided above the opening 16. The opening 16 is an aperture to communicate with the inside of the chamber 1, and the chamber 1 is sealed by arranging the window 110 so as to close the opening 16.

There may be a chamber mark 19 on the surface of the chamber 1. The chamber mark 19 is a mark to indicate a reference position of the chamber 1, and the position of the wafer W is detected with reference to the chamber mark 19. In addition, there may be a susceptor mark 25 on the surface of the turntable 2 in the vicinity of the concave portion 24. By regarding the chamber mark 19 as an absolute reference, and by detecting a relative position of the susceptor mark 25 relative to the chamber mark 19, the position of the wafer W can be detected.

The window 110 is provided on the opening 16, and ensures an imaging visual field possible to be viewed from the top by the camera 140 installed above while closing the aperture of the opening 16. The window 110 may be made of, for example, quartz glass and the like similarly to the window 18.

The illumination 120 is a light source to emit light, emits light upward toward the illumination reflecting plate 130 located above the illumination 120, and let the reflected light reflected from the illumination reflecting plate 130 enter the window 110. A variety of light sources can be used for the illumination 120 as long as the illumination 120 can emit light with a proper luminance, and for example, an LED (Light Emitting Diode) may be used. The illumination 120 is provided in the vicinity of the wall surface of the housing 150 so as not to block the imaging visual field of the camera 140, and emits light obliquely upward.

The illumination reflecting plate 130 is a light reflecting unit that reflects the light entering from the illumination 120, irradiates the window 110 with the reflected light, and illuminates the inside of the chamber 1. The illumination reflecting plate 130 includes a reflecting surface on its lower surface because the illumination reflecting plate 130 reflects the light entering from below. The illumination reflecting plate 130 has an opening 132 so as not to block the imaging visual field of the camera 140.

The camera 140 is an imaging unit to image the inside of the chamber 1 through the window 110. A variety of cameras is available for the camera 140 depending on intended purpose, and for example, a CCD camera and a CMOS camera are available for the camera 140.

The housing 150 is a casing to house the window 110, the illumination 120, the illumination reflecting plate 130 and the camera 140. By covering the whole components with the housing 150, an area surrounding the camera 140 can be made dark, which is proper for taking an image.

The processing part 160 is a unit to perform arithmetical processing to detect the position of the substrate based on the image taken by the camera 140. Hence, the processing part 160 may be configured as a microcomputer, an integrated circuit and the like similarly to the image processing part 190.

Figure 2:
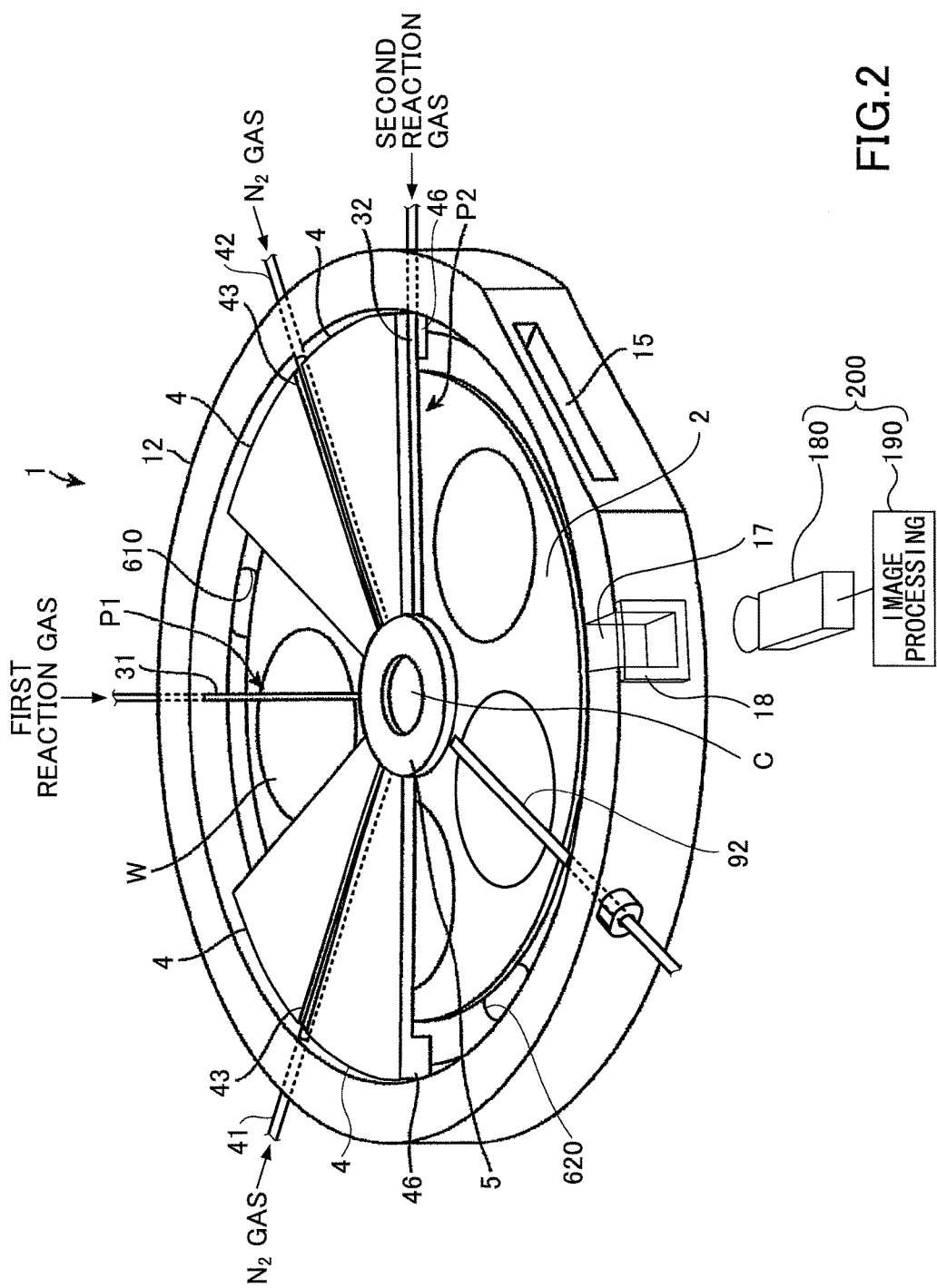
FIG. 2 is a perspective view of the ready for rotation state detection device and the substrate processing apparatus.

FIG. 2 is a perspective view of the ready for rotation state detection device and the substrate processing apparatus according to the first embodiment.

Figure 3:
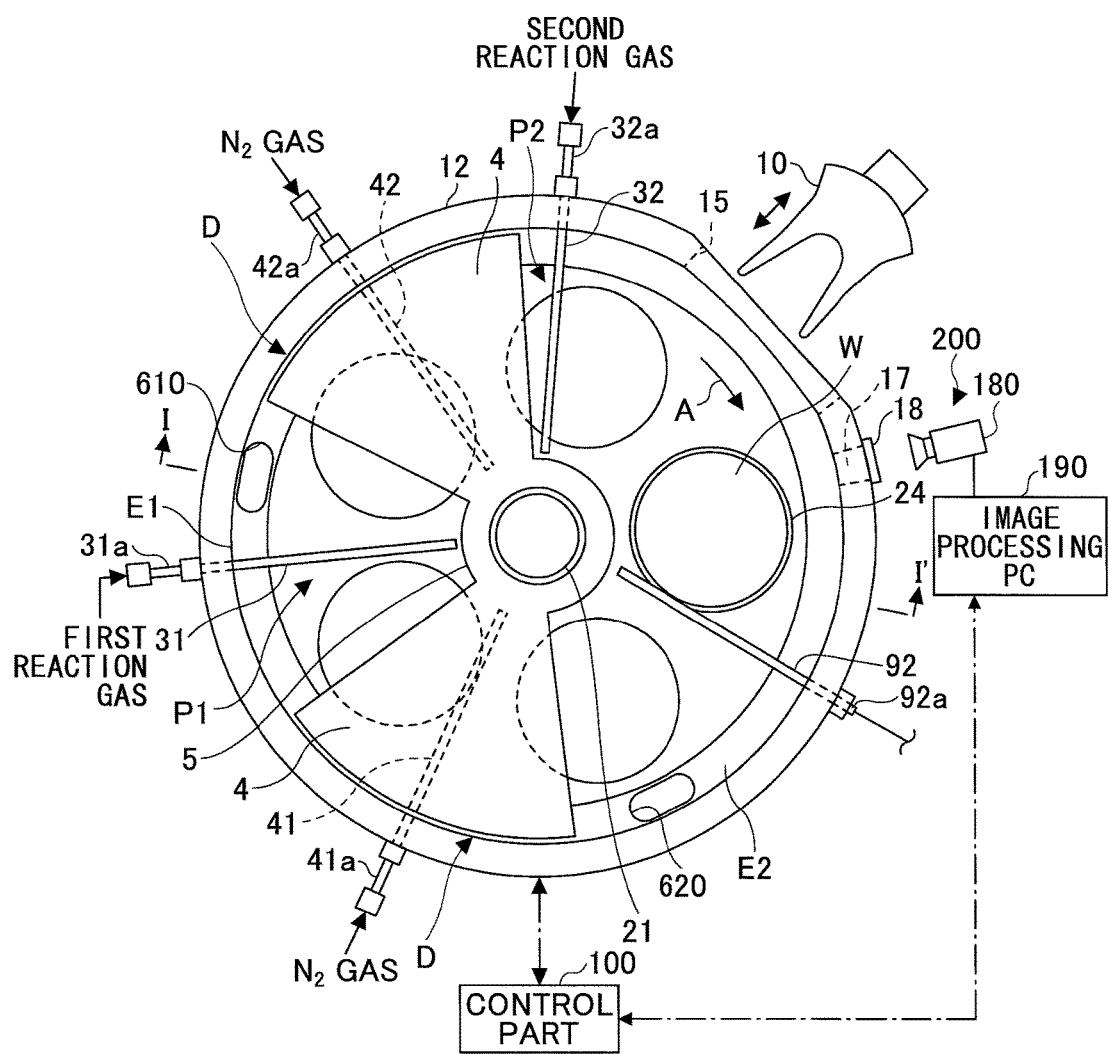
FIG. 3 is a schematic top view illustrating a configuration of a vacuum chamber of the ready for rotation state detection device and the substrate processing apparatus according to the first embodiment.

FIG. 3 is a schematic top view illustrating a configuration inside the vacuum chamber of the ready for rotation state detection device and the substrate processing apparatus according to the first embodiment.

As illustrated in FIGS. 2 and 3, a plurality of circular shaped wafer receiving portions 24 is provided to allow a plurality of (five in the example of FIG. 3) semiconductor wafers to be disposed along a rotational direction (i.e., a circumferential direction) W. In FIG. 3, the wafer W is shown in a single concave portion 24 for convenience. This concave portion 24 has an inner diameter that is slightly greater, for example, 4 mm, than a diameter of the wafer W (e.g., 300 mm), and the depth approximately equal to or greater than the thickness of the wafer. Accordingly, when the wafer W that is not warped is placed on the concave portion 24, the surface of the wafer W and the surface of the turntable 2 (which means an area where the wafer is not placed) have approximately the same height, or the surface of the wafer W is lower than the surface of the turntable 2. Here, when the concave portion 24 is configured to be deeper than the thickness of the wafer W, the depth is preferably configured to be equal to or less than about twice or three times as deep as the thickness of the wafer W. This is because if the concave portion 24 is configured to be deep, the wafer W seems to quickly go into a ready for rotation state, but it is liable to be difficult to perform a uniform film deposition when the warpage of the wafer W is too great even if the wafer edge is lower than the surface of the turntable 2. Moreover, if the concave portion 24 is configured to be too deep, it takes extra time to transfer the wafer W into/from the concave portion 24, and a process gas reaching the surface of the wafer W is liable to be reduced during a film deposition. Accordingly, the depth of the concave portion 24 is preferably the same as the thickness of the wafer W, or greater than the thickness of the wafer W and equal to or less than twice to three times as great as the thickness of the wafer W.

In the bottom surface of the concave portion 24, through-holes to allow lift pins, for example, three of the lift pins for lifting the wafer W by supporting the back surface of the wafer W, to penetrate therethrough are formed (both of which are not shown in the drawings).

As illustrated in FIGS. 2 and 3, above the turntable 2, a reaction gas nozzle 31, a reaction gas nozzle 32, and separation gas nozzles 41 and 42 are arranged at intervals in a circumferential direction (in a rotational direction of the turntable 2 (indicated by an arrow A in FIG. 3)) of the vacuum chamber 1. In an example illustrated in FIGS. 2 and 3, a separation gas nozzle 41, the reaction gas nozzle 31, the separation gas nozzle 42, and the reaction gas nozzle 32 are arranged in a clockwise fashion (in the rotational direction of the turntable 2) from a transfer opening 15 described later in this order. These nozzles 31, 32, 41 and 42 are introduced into the vacuum chamber 1 from an external wall by fixing gas introduction ports, which are base end portions of the respective nozzles 31, 32, 41 and 42, to the external wall of the chamber body 12 (see FIG. 3), and are installed so as to extend along a radial direction of the chamber body 12 and to extend parallel to the turntable 2.

In the present embodiment, the reaction gas nozzle 31 is connected to a first reaction gas supply source (which is not shown in the drawings), through a pipe and a flow rate controller (both of which are not shown in the drawings). The reaction gas nozzle 32 is connected to a second reaction gas supply source (which is not shown in the drawings), through a pipe and a flow rate controller (both of which are not shown in the drawings). The separation gas nozzles 41 and 42 are both connected to a separation gas supply source (which is not shown in the drawings), through a pipe and a flow rate controller (both of which are not shown in the drawings). A noble gas such as helium (He) gas, argon (Ar) gas, or an inactive gas such as a nitrogen ($N_2$) gas can be used as the separation gas. In the present embodiment, an example of using $N_2$ gas is illustrated.

In general, a gas for film deposition such as a Si-containing gas is used as the first reaction gas, and a gas such as an oxidation gas and a nitriding gas or a gas for film deposition similar to the first reaction gas is used as the second reaction gas in many cases.

The reaction gas nozzles 31 and 32 include a plurality of gas discharge holes 33 that are open downward facing the turntable 2 (see FIG. 4) and are arranged along lengthwise directions of the reaction gas nozzles 31 and 32 at intervals of, for example, 10 mm. An area under the reaction gas nozzle 31 is a first process area P1 to supply the first reaction gas and to adsorb the first reaction gas on the wafer W. An area under the reaction gas nozzle 32 is a second process area P2 to supply the second reaction gas that reacts with the first reaction gas adsorbed on the wafer W in the first process area P1 and to deposit a reactive product generated from the first reaction gas and the second reaction gas.

By rotating the turntable 2 to cause the wafer W to pass the first process area P1 where the first reaction gas is supplied and the second process area P2 where the second process gas is supplied sequentially, the first reaction gas adsorbs on the surface of the wafer W, and the reactive product generated by reaction between the first reaction gas and the second reaction gas sequentially deposits on the surface of the wafer W, by which an atomic layer or a molecular layer of the reactive product is deposited on the surface of the wafer W.

Because the substrate processing apparatus 210 of the first embodiment performs the film deposition by the ALD method or the MLD method caused by such rotation of the turntable 2, after the wafers W are transferred into the chamber 1 and are sequentially placed on the concave portions 24, the start of film deposition process has to be awaited until the warpage of the wafer W falls within some range and goes into a state in which the film deposition can start by rotating the turntable 2. In other words, if the turntable 2 is rotated in a state where the warpage of the wafer W still remains and the wafer W flies out of the concave portion 24, not only the wafer W having flied out is damaged, but also the inside of the chamber 1 is damaged, which is liable not to be able to perform the subsequent manufacturing process.

Accordingly, in the substrate processing apparatus 210 of the first embodiment, the opening 17 is formed in the side surface of the chamber body 12 on the slightly left side of the transfer opening 15 and is covered with the window 18, and the camera 180 is disposed outside the window 18. The camera 180 can take an image of the inside of the chamber 1 through the window 18, and is disposed at a position that can take an image of the edge of the wafer W placed on the concave portion 24. This enables the camera 180 to take an image of the warpage state of the wafer W after being placed on the concave portion 24, which makes it possible to readily detect that the wafer W goes into a state ready to rotate. Moreover, because taking an image can be performed continuously, the warpage state of the wafer W can be monitored after being placed on the concave portion 24 by the camera 180, and as soon as the wafer W goes into a state ready to start rotating, the state ready to start rotating can be detected. As discussed above, detecting the ready for rotation state is possible by the image processing performed by the image processing part 190.

Then, after detecting the state ready to start rotating the first wafer W, the turntable 2 is moved in series, and the warpage state of the wafer W secondly placed on the concave portion 24 is observed. This procedure is repeated in series, and when detecting the state ready to start rotation of each of the five wafers W placed on each of the concave portions 24, the state ready to start rotating the turntable 2 is detected. This allows the above film deposition process to start promptly and makes it possible to minimize loss of time for waiting.

Next, a more detailed description is given below of a configuration of the substrate processing apparatus of the first embodiment.

With reference to FIGS. 2 and 3, two convex portions 4 are provided in the vacuum chamber 1. The convex portion 4 is attached to the back surface of the ceiling plate 11 so as to protrude toward the turntable 2 in order to form separation areas D with the separation gas nozzles 41 and 42, as described later. Furthermore, the convex portions 4 have an approximately sectorial planar shape whose apex is cut in an arc-like form. In the present embodiment, the inner arc is coupled to a protrusion portion 5 (which is described later), and the outer arc is arranged so as to be along an inner periphery of the chamber body 12 of the vacuum chamber 1.

Figure 4:
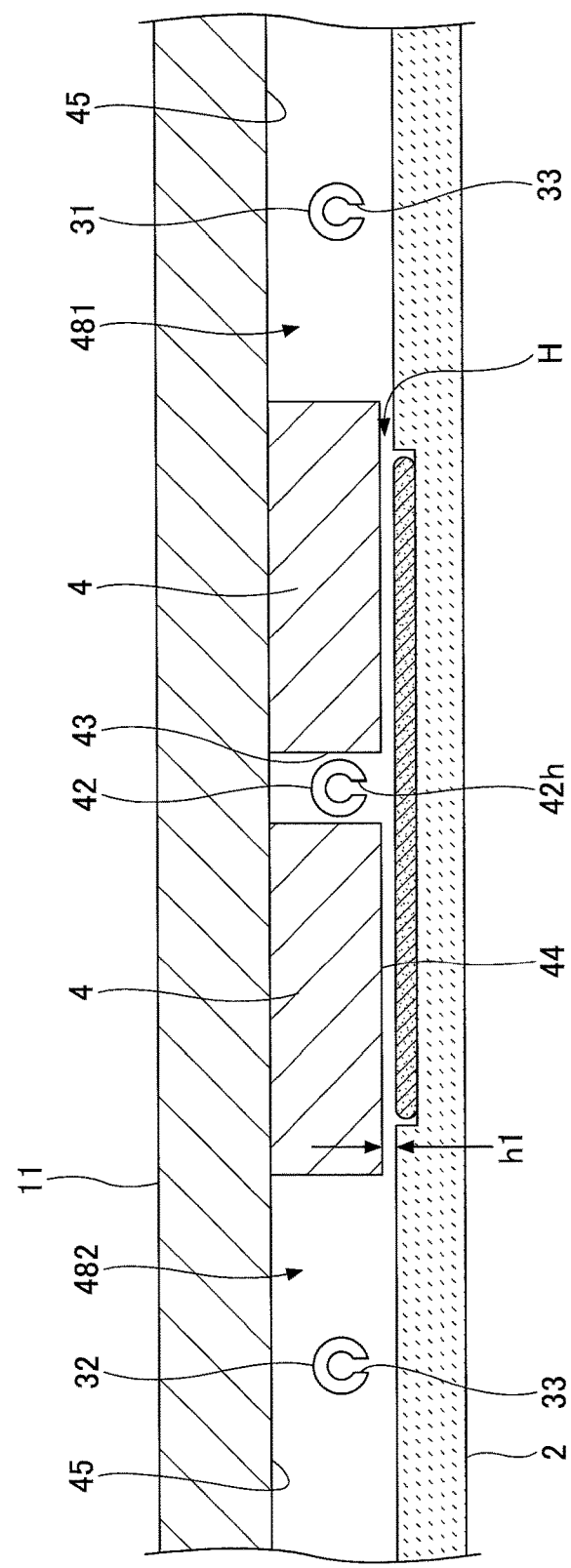
FIG. 4 is a cross-sectional view of a chamber along a concentric circle of a turntable of the substrate processing apparatus according to the first embodiment.

FIG. 4 illustrates a cross-section of the chamber 1 along the concentric circle of the turntable 2, from the reaction gas nozzle 31 to the reaction gas nozzle 32 of the substrate processing apparatus according to the first embodiment. As illustrated in FIG. 4, because the convex portion 4 is attached to the back surface of the ceiling plate 11, there are flat and low ceiling surfaces 44 (i.e., first ceiling surfaces) that are bottom surfaces of the convex portions 4, and ceiling surfaces 45 (i.e., second ceiling surfaces) that are located on both sides of the ceiling surfaces 44 in the circumferential direction and higher than the ceiling surfaces 44. The convex portions 4 have an approximately sectorial planar shape whose apex is cut in an arc-like form. In addition, as shown in FIG. 4, a groove 43 is formed in the convex portion 4 so as to extend along the radial direction of the turntable 2 at the center in the circumferential direction. The groove portion 43 houses the separation gas nozzle 42. The groove portion 43 is also formed in the other convex portion 4 in a similar way, and houses the separation gas nozzle 41 therein. Furthermore, the reaction gas nozzles 31 and 32 are provided in a space under the high ceiling surfaces 45, respectively. These reaction gas nozzles 31 and 32 are provided in the vicinity of the wafer w apart from the ceiling surfaces 45. Here, as illustrated in FIG. 4, the reaction gas nozzle 31 is provided in a space 481 on the right and under the high ceiling surface 45, and the reaction gas nozzle 32 is provided in a space 482 on the left and under the high ceiling surface 45.

In addition, the separation gas nozzles 41 and 42 include a plurality of gas discharge holes 42h that are open downward facing the turntable 2 (see FIG. 4) and are arranged along lengthwise directions of the separation gas nozzles 41 and 42 at intervals of, for example, 10 mm.

The ceiling surface 44 forms a separation space H that is a narrow space relative to the turntable 2. When an $N_2$ gas is supplied from the gas discharge holes 42h of the separation gas nozzle 42, the $N_2$ gas flows to the space 481 and the space 482 through the separation space H. At this time, because a volume of the separation space is smaller than that of the spaces 481 and 482, a pressure of the separation space H can be higher than that of the spaces 481 and 482 by the $N_2$ gas. In other words, the separation space H having a high pressure is formed between the spaces 481 and 482. Furthermore, the $N_2$ gas flowing from the separation space H to the spaces 481 and 482 works as a counter flow against the first reaction gas flowing from the first process area P1 and the second gas flowing from the second process area P2. Accordingly, the first reaction gas from the first process area P1 and the second reaction gas from the second process area P2 are separated by the separation space H. Hence, a mixture and a reaction of the first reaction gas and the second reaction gas in the vacuum chamber 1 are reduced.

Here, a height h1 of the ceiling surface 44 relative to the upper surface of the turntable 2 is preferably set at an appropriate height to make the pressure of the separation space H higher than the pressure of the spaces 481 and 482, considering the pressure in the vacuum chamber 1, a rotational speed of the turntable 2, and a supply amount of the separation gas (i.e., $N_2$ gas) to be supplied.

With reference to FIGS. 1 through 3 again, a protrusion portion 5 is provided on the lower surface of the ceiling plate 11 so as to surround an outer circumference of the core portion 21 that fixes the turntable 2. In the present embodiment, this protrusion portion 5 continuously extends to a region on the rotational center side of the convex portion 4, and the lower surface of the protrusion portion 5 is formed to be the same height as the ceiling surface 44.

FIG. 1, which was previously referred to, illustrates an area where the ceiling surface 45 is provided.

Figure 5:
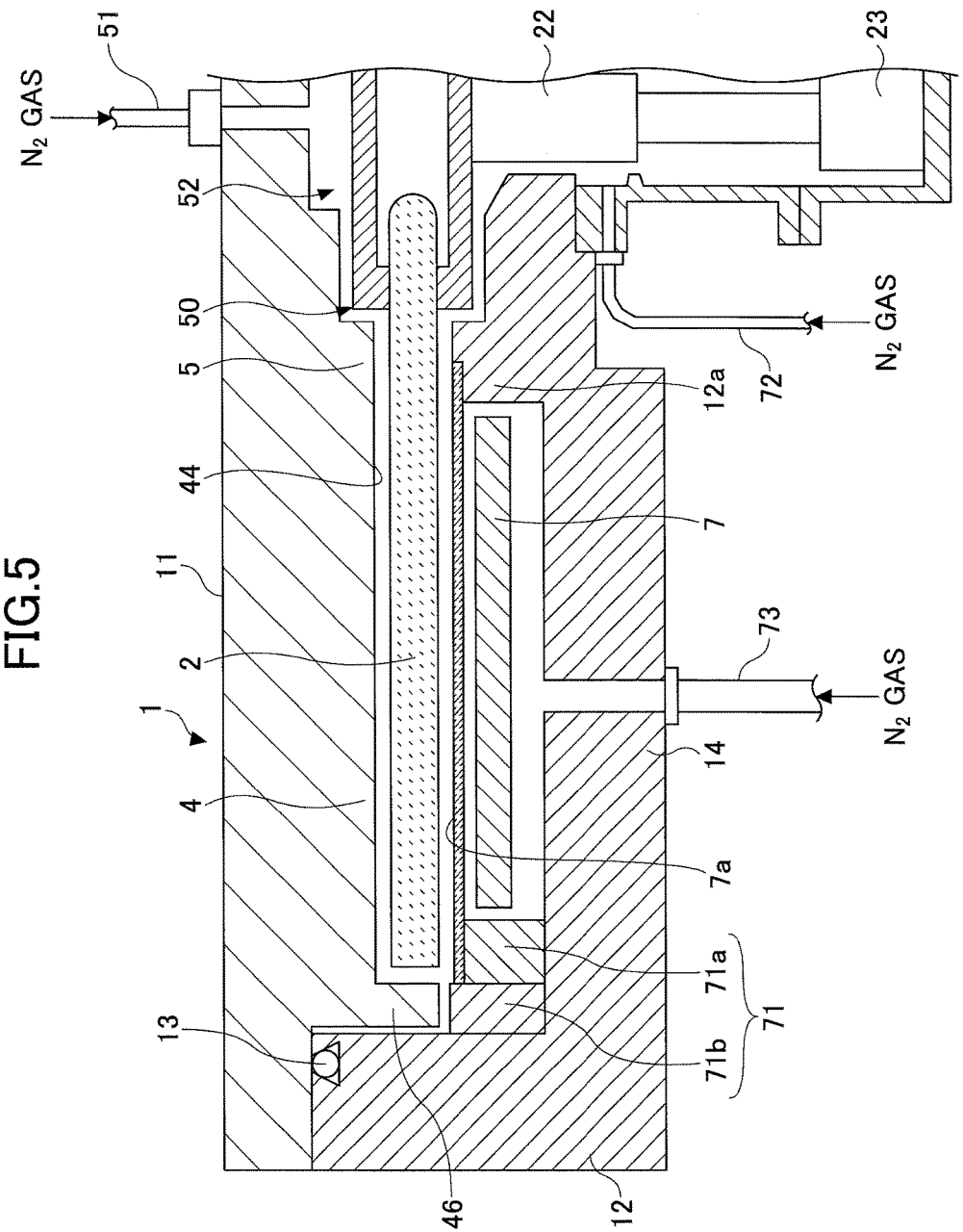
FIG. 5 is a cross-sectional view illustrating an area provided with a ceiling surface of the substrate processing apparatus according to the first embodiment.

On the other hand, FIG. 5 is a partial cross-sectional view illustrating an area where the ceiling surface 44 is provided. As shown in FIG. 5, a bent portion 46 that is bent into an L-letter shape is formed in a periphery of the approximately sectorial convex portion 4 (i.e., a region on the outer edge of the vacuum chamber 1) so as to face the outer edge surface of the turntable 2. The bent portion 46 prevents the reaction gases from flowing into the separation areas D from both sides thereof, and prevents both of the reaction gases from being mixed with each other. Because the sectorial convex portion 4 is provided on the ceiling plate 11, and the ceiling plate 11 is detachable from the chamber body 12, there is a slight gap between the outer periphery of the bent portion 46 and the inner periphery of the chamber body 12. A gap between the inner periphery of the bent portion 46 and the outer edge surface of the turntable 2, and the gap between the outer periphery of the bent portion 46 and the inner periphery of the chamber body are, for example, set at a size similar to a height of the ceiling surface 44 relative to the upper surface of the turntable 2.

As illustrated in FIG. 5, while the inner peripheral wall of the chamber body 12 is formed into a vertical surface close to the outer periphery of the bent portion 46 in the separation areas D, for example, as illustrated in FIG. 1, locations other than the separation areas D are recessed outward from locations facing the outer edge of the turntable 2 throughout the bottom part 14. Hereinafter, for convenience of explanation, depressed portions having a roughly rectangular cross-sectional shape along the radius direction are expressed as evacuation areas. More specifically, as illustrated in FIG. 3, an evacuation area communicated with the first process area P1 is expressed as an evacuation area E1, and an evacuation area communicated with the second process area P2 is expressed as an evacuation area E2. As illustrated in FIGS. 1 through 3, there are a first evacuation opening 610 and a second evacuation opening 620 in the bottom portions of the first evacuation area E1 and the second evacuation area E2, respectively. As shown in FIG. 1, the first evacuation opening 610 and the second evacuation opening 620 are connected to, for example, vacuum pumps 640 of a evacuation unit through evacuation pipes 630, respectively. FIG. 1 also shows a pressure controller 650.

As illustrated in FIGS. 1 and 5, a heater unit 7 that is a heating means is provided in a space between the turntable 2 and the bottom part 14 of the vacuum chamber 1, and the wafer W on the turntable 2 is heated up to a temperature determined by a process recipe (e.g., 400 degrees C.) through the turntable 2. A ring-shaped cover member 71 is provided on the lower side of the periphery of the turntable 2 to prevent a gas from intruding into a space under the turntable 2 by separating an atmosphere in which the heater unit 7 is disposed from an atmosphere from a space above the turntable 2 to the evacuation areas E1 and E2 (see FIG. 5). This cover member 71 includes an inner member 71a provided so as to face the outer edge portion of the turntable 2 and a further outer portion from the lower side, and an outer member 71b provided between the inner member 71a and the inner wall surface of the vacuum chamber 1. The outer member 71b is provided under the bent portion 46 formed in the outer edge portion of the convex portion 4 and close to the bent portion 46, and the inner member 71a is provided to surround the heater unit 7 throughout the whole circumference under the outer edge portion of the turntable 2 (and the slightly further outer portion).

As shown in FIG. 5, the bottom part 14 in a region closer to the rotational center than the space where the heater unit 7 is arranged forms a protrusion part 12a so as to get closer to the core portion 21 in the center portion of the lower surface of the turntable 2. A gap between the protrusion part 12a and the core portion 21 forms a narrow space. Moreover, a gap between an inner periphery of a through-hole of the rotational shaft 22 that penetrates through the bottom part 14 and the rotational shaft 22 is narrow, and the narrow space is in communication with the case body 20. The case body 20 includes a purge gas supply pipe 72 to supply the $N_2$ gas as a purge gas to the narrow space for purging the narrow space. Furthermore, a plurality of purge gas supply pipes 73 is provided at predetermined angular intervals in the circumferential direction under the heater unit 7 to purge the arrangement space of the heater unit 7. In addition, a lid member 7a that covers from the inner peripheral wall of the outer member 71b (i.e., the upper surface of the inner member 71a) to the upper end of the protrusion part 12a throughout the circumferential direction is provided between the heater unit 7 and the turntable 2 to prevent the gas from entering the area including the heater unit 7. The lid member 7a can be made of, for example, quartz.

Moreover, as shown in FIG. 5, a separation gas supply pipe 51 is connected to the central part of the ceiling plate 11 of the vacuum chamber 1, and is configured to supply an $N_2$ gas of the separation gas to a space 52 between the ceiling plate 11 and the core portion 21. The separation gas supplied to the space 52 is discharged toward the outer edge through a narrow space 50 between the protrusion portion 5 and the turntable 2, and along the surface of the turntable 2 on the wafer receiving area side. The space 50 can be maintained at a higher pressure than that of the spaces 481 and 482 by the separation gas. Accordingly, the space 50 serves to prevent the first reaction gas supplied to the first process area P1 and the second reaction gas supplied to the second process area P2 from being mixed through the center area C. In other words, the space 50 (or the center area C) can function as well as the separation space H (or the separation area D).

Furthermore, as shown in FIGS. 2 and 3, a transfer opening 15 is formed in the side wall of the vacuum chamber 1 to transfer the wafer W, which is the substrate, between an external transfer arm 10 and the turntable 2. The transfer opening 15 is configured to be hermetically openable and closeable by a gate valve not shown in FIGS. 2 and 3. Moreover, the wafer W is transferred between the concave portions 24, which are the wafer receiving areas in the turntable 2, and the transfer arm 10 at a position where one of the concave portions 24 faces the transfer opening 15. Accordingly, lift pins for transfer to lift up the wafer W from the back side by penetrating through the concave portion 24 and the lifting mechanism (none of which are shown in the drawing) are provided at the position corresponding to the transfer position under the turntable 2.

Moreover, as shown in FIG. 1, a control part 100 constituted of a computer to control operations of the whole apparatus is provided in the film deposition apparatus of the present embodiment, and a program to implement a film deposition process described below is stored in a memory of the control part 100. This program is constituted of instructions of step groups to cause the apparatus to implement each operation of the apparatus, stored in and a storage medium 102 such as a hard disk, a compact disc, a magnetic optical disk, a memory card and a flexible disk, read by a predetermined reading device into a memory part 101, and installed into the control part 100. The control part 100 may control the above-mentioned processing part 160, the image processing part 190 and the like.

Thus, the ready for rotation state detection device 200 according to the first embodiment can be properly applied to the turntable-type substrate processing apparatus 210.

Next, a more detailed description is given of the ready for rotation state detection device 200 according to the first embodiment of the present invention.

Figure 6:
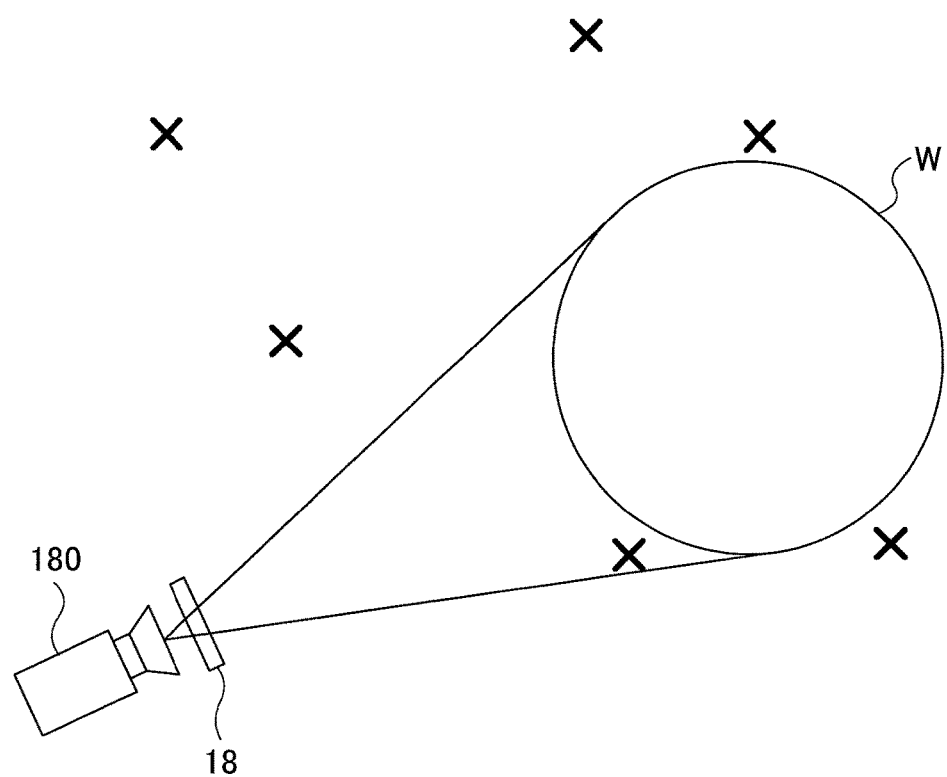
FIG. 6 is a drawing for explaining an arrangement and a view angle of a camera of the ready for rotation state detection device according to the first embodiment of the present invention.

FIG. 6 is a drawing for explaining an arrangement and a view angle of the camera 180 of the ready for rotation state detection device 200 according to the first embodiment of the present invention. FIGS. 1 through 3 illustrate a positional relationship between the camera 180 and the chamber 1. As illustrated in FIG. 6, the view angle from the camera 180 can be set so that the camera 180 can take an image of the entire edge throughout the whole circumference of the wafer W by one shot. More specifically, because the view angle of the camera 180 enables the camera 180 to take an image of an area including both of the edges of the wafer W, the camera 180 can image a height of the surface of the edge of the wafer W when the surface of the edge is higher than the surface of the turntable 2 for the whole edge of the concave portion 24. This makes it possible to certainly ensure the state of the wafer W not flying out of any location even if the turntable 2 is rotated.

Here, the view angle in the state illustrated in FIG. 6 can be readily set by considering the view angle of the camera 180, a size of the window 18, and a distance between the window 18 and the camera 180.

In this manner, by setting the imaging area of the camera 180 appropriately, the ready for rotation state can be certainly detected for the whole circumference of the wafer W.

FIG. 7 is a drawing illustrating an example of a device configuration of the ready for rotation state detection device according to the first embodiment of the present invention. As illustrated in FIG. 7, the ready for rotation state detection device of the present embodiment 200 includes the camera 180 and the image processing part 190. The ready for rotation state detection device 200 images the wafer W placed on the concave portion 24 formed in the surface of the turntable 2 of the substrate processing apparatus 210 of the present embodiment from the side through the window 18. The window 18 is arranged to include at least an area as high as the surface of the turntable 2, by which the camera 180 can take an image at almost the same height as the surface of the turntable 2. The camera 180 can take an image of the surface of the turntable 2 or the edge of the concave portion 24, and an area of the wafer W protruding from the concave portion 24 together, and can detect that the upper end of the wafer W protrudes from the concave portion in the height direction by taking an image.

Here, an analog camera and the like are available for the camera 180 in addition to the digital camera such as the CCD camera and the CMOS camera.

The image data taken by the camera 180 are sent to the image processing part 190. The image processing part 190 specifies an upper end position of the wafer W and a position of the surface of the turntable 2 by image processing from the image data received from the camera 180, and determines whether the upper end of the wafer W is located lower than the surface of the turntable 2. Whether the upper end of the wafer W is located lower than the surface of the turntable 2 can be determined based on whether an edge of the upper end of the wafer W has disappeared or not. In other words, a state capable of detecting the edge of the upper end of the wafer W means that the upper end of the wafer W protrudes from the surface of the turntable 2. On the other hand, a state of the edge of the upper end of the wafer W below the surface of the turntable 2 means that the wafer W is in a state where the edge of the wafer W is hidden by the surface of the turntable 2 and cannot be imaged from the camera 180, by which the state can be detected in which the warpage of the wafer W has decreased to the extent that the wafer W does not fly out even if the turntable 2 is rotated.

For example, the image processing part 190 may be configured to continue to send a state signal to the control part 100 about whether the wafer W is in the ready for rotation state or not, or may be configured to send the state signal when the state has changed. More specifically, when the wafer W is placed on the concave portion 24, if the wafer W is warping and in an unready for rotation state, the image processing part 190 sends a state signal indicating an unready for rotation state to the control part 100, and may send a state signal indicating a ready for rotation state to the control part 100 after going into the ready for rotation state, in which the state signal may be consecutive, or may be like a trigger signal transmitted only when the state changes.

The image processing part 190 may have an image processing function and an arithmetic processing function capable of the image processing and determination processing, and may be constituted of a computer including a microcomputer, an integrated circuit and the like.

Here, as illustrated in FIGS. 2 and 3, the plurality of concave portions 24 is formed in the surface of the turntable 2, and when the plurality of wafers W is each placed on the concave portion 24, a detection action of the ready for rotation state is performed every time the wafer W is placed on the concave portion 24. When the ready for rotation state is detected for all of the wafers W, it may be determined that the turntable 2 is rotatable. The determination may be performed by the image processing part 190 or the control part 100. Here, because the control part 100 performs the whole control of the substrate processing apparatus 210, the image processing part 190 may perform an individual detection in series, and the control part 100 may be configured to determine the whole.

Moreover, an upper limit time may be set in the determination processing performed by the image processing part 190. More specifically, time is measured just after the wafer W is placed on the concave portion 24, and when the ready for rotation state is not detected within a predetermined time, the process of outputting and sending an alarm signal to the control part 100 may be performed. The control part 100 can stop the substrate processing apparatus 210, and take measures such as inspecting the whole apparatus as necessary.

In this case, the upper limit time may be made changeable, and for example, a time setting table may be provided. A settable range of the time may be made, for example, from 0 to 300 seconds, and the 0 second setting may be made a non-monitoring setting when such a time setting is unnecessary.

Thus, the ready for rotation state detection device 200 of the present embodiment can add a variety of functions depending on intended use.

FIGS. 8A and 8B are drawings illustrating an example of a taken image by the rotatable detection device 200 according to the first embodiment of the present invention.

FIG. 8A is a drawing illustrating an example of a taken image in an unready for rotation state. FIG. 8A illustrates the wafer W placed on the turntable 2 is in a state of warping and the end thereof being located above the surface of the turntable 2. The camera 180 takes an image of the left end of the wafer W, and pixels 180a of the camera 180 are schematically illustrated. FIG. 8A illustrates the unready for rotation state of an edge of the wafer end WE located much higher than an edge TE of the surface of the turntable 2, and the wafer W likely to fly out if the turntable 2 is rotated as it is.

FIG. 8B is a drawing illustrating an example of a taken image in the unready for rotation state. FIG. 8B illustrates a state of the edge WE of the wafer W located below the edge TE of the surface of the turntable 2 and incapable of being imaged. This state means a state in which the warpage of the wafer W has subsided and the end of the wafer W is located below the surface of the turntable 2, which means a ready for rotation state in which the wafer W comes to a stop against the inner wall of the concave portion 24 when the turntable 2 is rotated and does not fly out of the concave portion 24. Thus, whether the wafer W is in the ready for rotation state or the unready for rotation state can be detected based on the image taken by the camera 180.

Figure 9A:
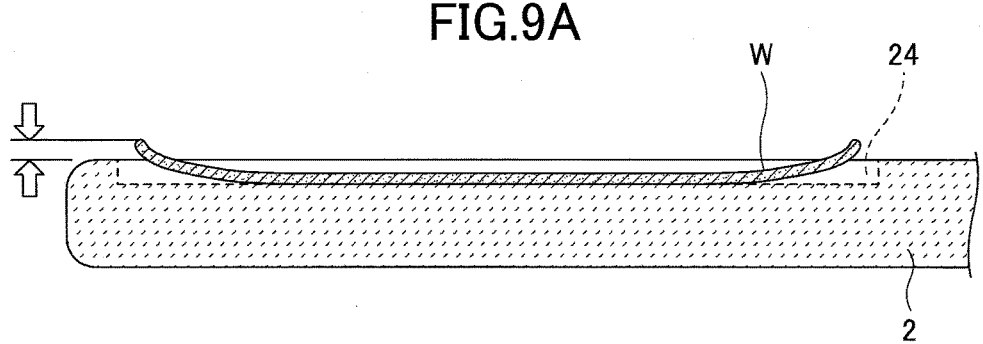
FIGS. 9A through 9C are drawings illustrating an example of a state change of a wafer placed on a turntable.
Figure 9B:
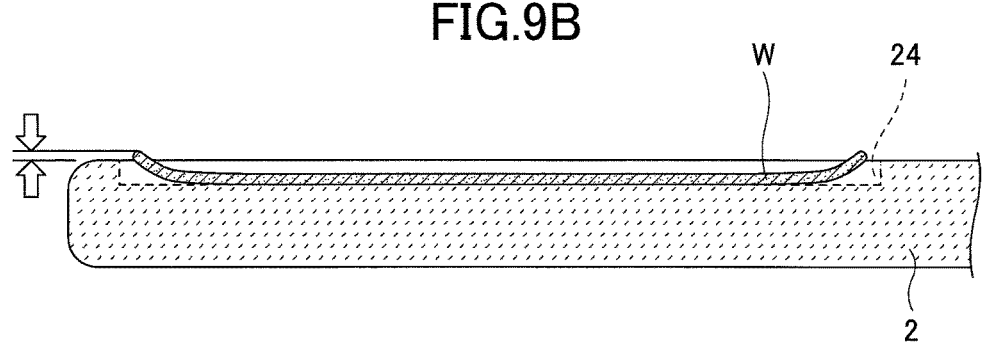
Figure 9C:
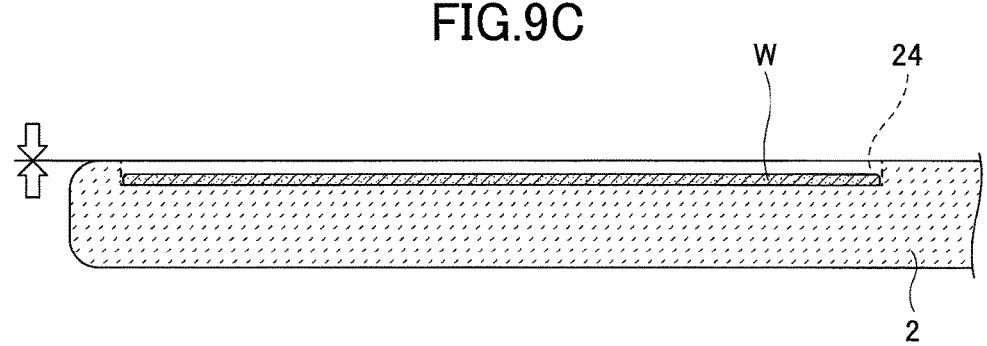

FIGS. 9A through 9C are drawings illustrating an example of state change of the wafer W placed on the turntable 2. FIG. 9A is a drawing illustrating an example of a state just after the wafer W is placed on the concave portion 24. Because the environment rapidly changes from room temperature to a heated atmosphere just after the wafer W is placed on the concave portion 24, the wafer W warps and the end of the wafer W warps upward.

FIG. 9B is a drawing illustrating an example of a state in which a certain period of time has passed after the wafer is placed on the concave portion 24. As illustrated in FIG. 9B, the higher the temperature of the wafer W becomes, the smaller the warpage of the wafer W becomes. However, because the end of the wafer W is located above the surface of the turntable 2, the wafer W is liable to fly out of the concave portion 24 when the turntable 2 is rotated as it is.

FIG. 9C is a drawing illustrating an example of a state of the warpage of the wafer W being resolved. When the warpage of the wafer W becomes small, and the end of the wafer W becomes lower than the surface of the turntable 2, the wafer W fits in the concave portion 24, and the wafer W disappears from the image taken by the camera 180. This state is a ready for rotation state.

In the ready for rotation state detection device 200 according to the first embodiment, by monitoring such a state change of the wafer W, the turntable 2 can start rotating and can start the substrate processing as soon as the wafer W goes into the ready for rotation state, by which the wafer's flying out can be certainly prevented, and the throughput can be improved by eliminating the extra waiting time.

Figure 10:
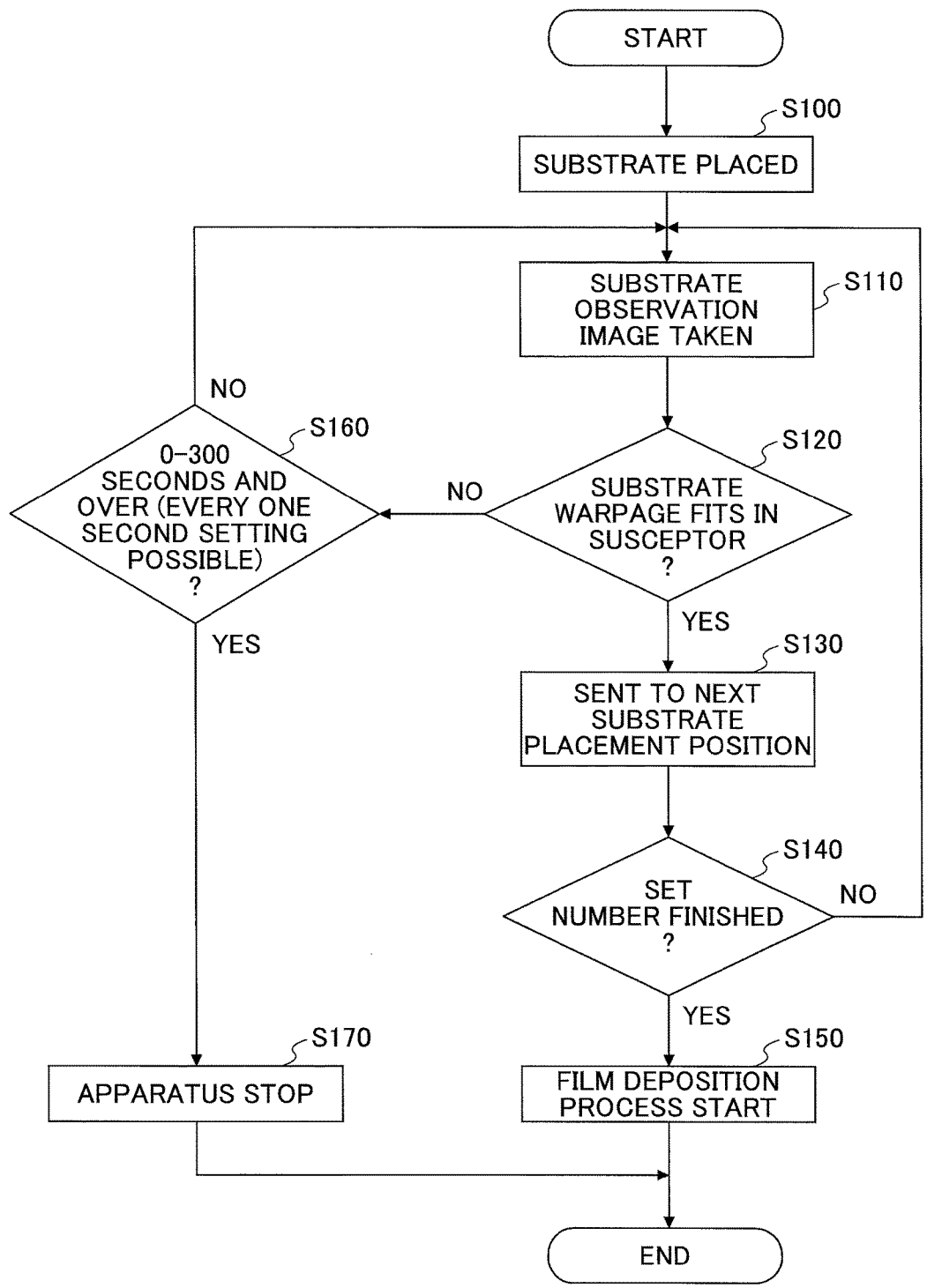
FIG. 10 is a process flowchart illustrating a method of detecting a ready for rotation state and a method of processing a substrate according to a first embodiment of the present invention.

FIG. 10 is a flowchart illustrating an example of a method of detecting a ready for rotation state and a method of processing a substrate according to the first embodiment of the present invention. Here, the same numerals are attached to components similar to the components described above, and the description is omitted.

In step S100, a wafer W is placed on the concave portion 24 that is a substrate receiving area formed in the surface of the turntable 2. At this time, because the wafer W is transferred to the heated atmosphere of about 400 degrees C. from the atmosphere of room temperature, the wafer W greatly warps due to the rapid temperature change as illustrated in FIGS. 8A and 9A.

In step S110, the camera 180 starts to take an observation image of the wafer W. This allows a state of the wafer W to be monitored by an image. The image taken and incorporated by the camera 180 is sent to the image processing part 190.

In step S120, whether the warpage of the wafer W fits in the concave portion 24 is determined. When the warpage of the wafer W fits in the concave portion 24, it is determined that the wafer W is in a ready for rotation state, and the process advances to step S130. When an end of the wafer W is located lower than the surface of the turntable 2, the wafer W is in the ready for rotation state for sure, but sometimes there is a case where the wafer W is unlikely to fly out of the concave portion 24 even if the turntable 2 is rotated although the upper edge of the wafer end is slightly higher than the surface of the turntable 2. Hence, considering such a case, the ready for rotation state may include a case in which an amount of protrusion of the wafer W from the surface of the turntable is equal to or lower than a predetermined value in a height direction. However, the predetermined value is preferably quite a small value close to zero in terms of certainly preventing the protrusion of the wafer W. Moreover, when the predetermined value is set at the same height as the surface of the turntable 2, the predetermined value naturally becomes zero-out.

In step S130, the turntable 2 is slightly rotated so that the concave portion 24 on which the next wafer W is placed comes to a position that the camera 180 can take an image thereof through the window 18.

In step S140, when the wafer W is moved, it is determined whether the detection of the ready for rotation state is finished for a predetermined number of the wafers W. For example, in a case using the turntable 2 illustrated in FIGS. 2 and 3, it is determined whether the detection of the ready for rotation state is finished for five of the wafers W.

In step S140, when it is determined that the detection of the ready for rotation state is finished for the predetermined number of wafers W, the process goes to step S150. In contrast, when it is determined that the detection of the ready for rotation state is not finished for the predetermined number of wafers W, the process returns to step S110, and a series of determination/detection processes to step S140 are repeated. When the series of processes are repeated for each wafer W, and are finished for the predetermined number of wafers W, the process goes to step S150.

In step S150, a film deposition process in the substrate processing apparatus 210 is started. More specifically, as described in FIGS. 1 through 5, the turntable 2 starts to rotate, and the film deposition process is carried out. When the predetermined film deposition process is finished, the process flow is finished.

On the other hand, in step S120, when it is determined that the warpage of the wafer W is not fitted in the concave portion 24, the process advances to step S160.

In step S160, it is determined whether not less than a predetermined detection-upper-limit time has passed just after the wafer W is placed on the concave portion 24. The upper limit time may be set, for example, in a range from 0 to 300 seconds.

In step S160, when it is determined that the upper limit time has not passed, the process returns to step S110, and the processes of steps S110, S120 and S160 are repeated until the warpage of the wafer W is subsided. In contrast, in step S160, it is determined that not less than the predetermined detection-upper-limit time has passed, an alarm signal is output to the control part 100, and the control part 100 stops the action of the substrate processing apparatus 210. This allows an operator of the substrate processing apparatus 210 to acknowledge a malfunction, which makes it possible to inspect a state of the substrate processing apparatus 210.

Here, in step S160, the detection-upper-limit time may be changeable depending on intended use and in like. For example, by providing a time setting table in one second units, the detection-upper-limit time can be set at any time by one second units. In this case, when the detection-upper-limit time is not provided, zero seconds may be set as a non-monitoring setting.

Furthermore, steps S160 and S170 are not necessary, but may be provided as necessary.

According to the method of detecting the ready for rotation state and the method of processing the substrate of the first embodiment, even if the warpage is generated when the wafer W is placed on the turntable 2, the ready for rotation state of the warpage subsiding to a state in which the turntable 2 is ready for rotation can be certainly detected in real time, and the substrate processing can be started in minimum waiting time, while ensuring to prevent the wafer W from flying out.

[Second Embodiment]

FIGS. 11A through 11F are drawings illustrating an example of a change state of the warpage of the wafer W when a wafer W is transferred into the chamber 1 and placed on the concave portion 24. As illustrated in FIGS. 11A through 11F, although the wafer W warps due to the rapid temperature change when the wafer W is placed on the concave portion 24 as discussed above, the wafer W does not necessarily warp in an instant, and the wafer W gradually warps by taking time of seconds to several ten seconds, for example, about ten and a few seconds to twenty and several seconds, in many cases. In such a case, the ready for rotation state detection device according to the first embodiment performs the detection when an amount of warpage gradually reduces from the maximum warpage state and the amount of warpage is still decreasing. Accordingly, in the ready for rotation state detection device 200 according to the first embodiment, the start of the detection has to wait for the time after the wafer W is placed on the concave portion 24 and until the warpage reaches the maximum amount, and has to wait for a predetermined time thought to certainly shift to the decrease of the amount of warpage, and the time is hereinafter called "warpage waiting time."

Figure 11A:
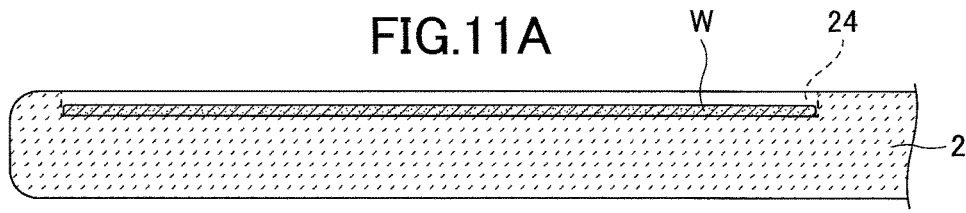
FIGS. 11A through 11F are drawings illustrating an example of a state change of a warpage of a wafer when the wafer is placed on a concave portion of a turntable in a chamber.
Figure 11B:
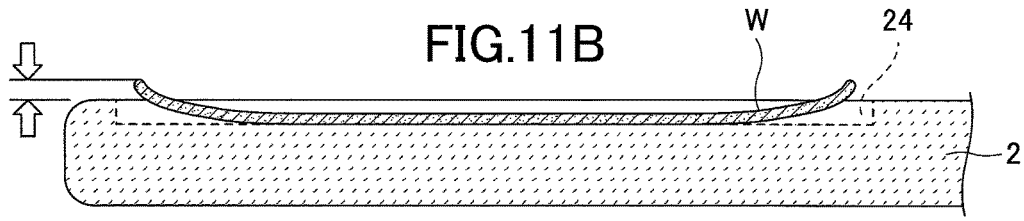
Figure 11C:
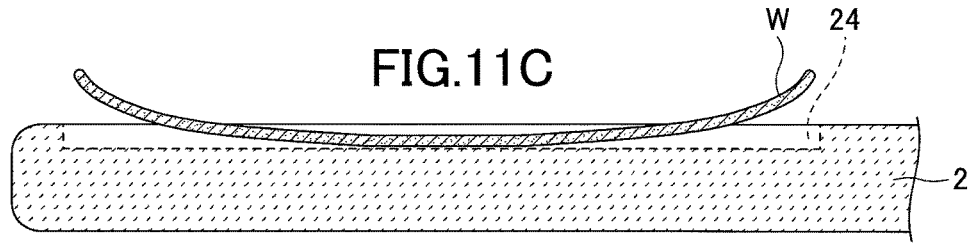
Figure 11D:
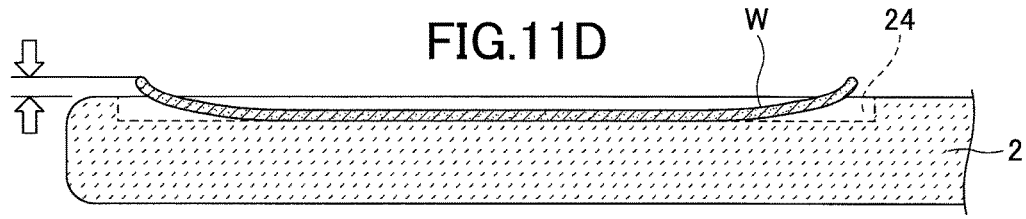
Figure 11E:
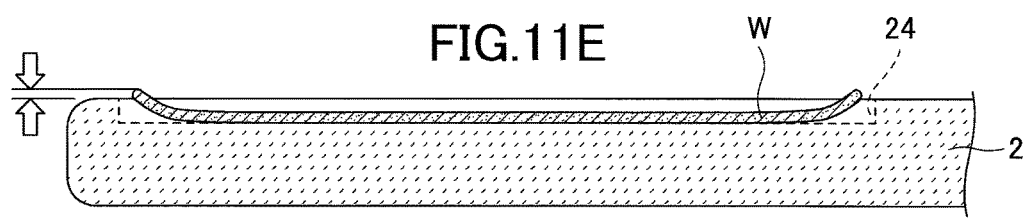
Figure 11F:
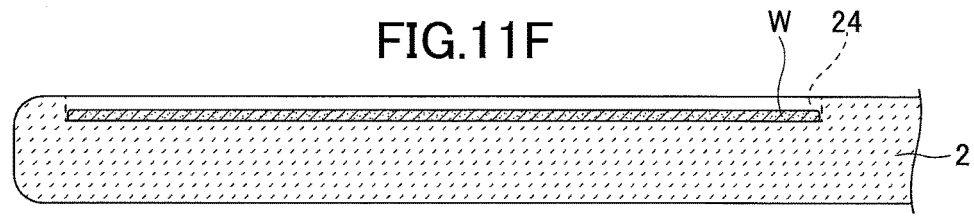

More specifically, after the wafer W is placed on the concave portion 24 as illustrated in FIG. 11A, the wafer W starts to warp as illustrated in FIG. 11B, and then the wafer reaches the maximum warpage amount as illustrated in FIG. 11C. When the time has passed further, the amount of warpage of the wafer W decreases as illustrated in FIGS. 11D and 11E, and the wafer W is finally fitted in the concave portion 24 and becomes flat as illustrated in FIG. 11F. Here, in order to use the ready for rotation state detection device 200 of the first embodiment, the time until reaching the state of FIG. 11C from FIG. 11A has to be made the warpage waiting time, and the ready for rotation state detection has to be performed after passing the warpage waiting time. The warpage waiting time is, for example, set at about 20 seconds, and the time becomes complete waiting time in the ready for rotation state detection device 200 of the first embodiment.

In the meantime, sometimes the wafer W may rapidly reach the maximum warpage and go into the ready for rotation state within the warpage waiting time without waiting for the warpage waiting time depending on the warpage state of the wafer W. In such a case, a sequence that starts the ready for rotation state detection only after passing the warpage waiting time causes extra waiting time and decreases the throughput.

In a second embodiment, a description is given below of a ready for rotation state detection device that determines that the wafer W is in the ready for rotation state and can move to the ready for rotation state detection of the next wafer W even during the warpage waiting time, when the warpage of the wafer W sufficiently subsides and the wafer W does not warp any more, that is to say, when the wafer W is not in a warpage increasing state.

Figure 12:
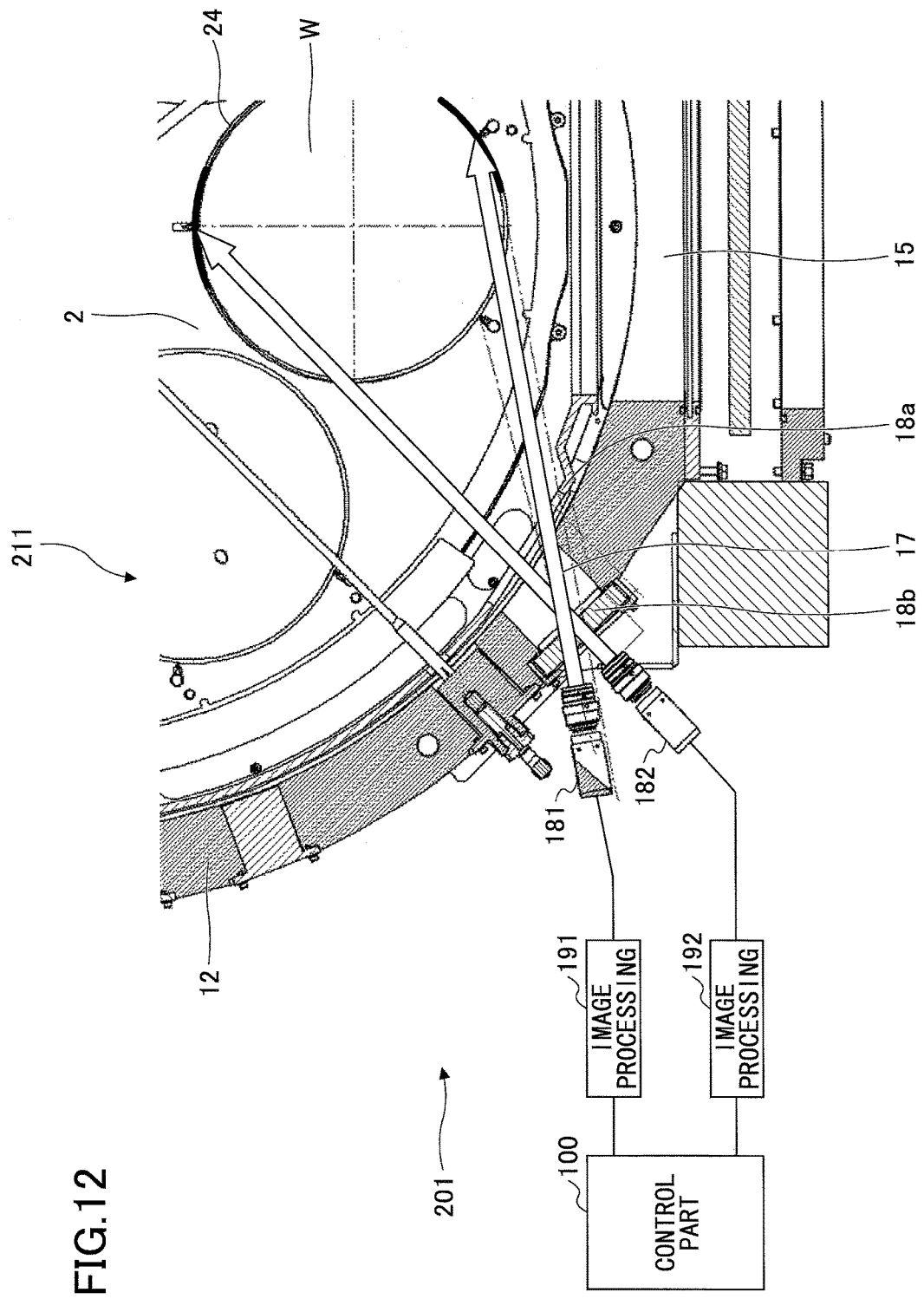
FIG. 12 is a drawing illustrating an example of a ready for rotation state detection device and a substrate processing apparatus according to a second embodiment of the present invention.

FIG. 12 is a drawing illustrating an example of a ready for rotation state detection device 201 and a substrate processing apparatus 211 according to the second embodiment of the present invention. FIG. 12 illustrates a top view of the chamber body 12 when the ceiling plate 11 is removed from the chamber 1, in which a state of the wafer W placed on the concave portion 24 formed in the surface of the turntable 2 is illustrated. In addition, the opening 17 is formed in the side wall of the chamber body 12, and an inner window 18a covering the inner wall side of the opening 17 and an outer window 18b covering the outer wall side of the opening 17 are provided.

Moreover, the ready for rotation state detection device 201 of the second embodiment is provided outside the substrate processing apparatus 211. The ready for rotation state detection device 201 includes two cameras 181 and 182, image processing parts 191 and 192 corresponding to the respective cameras 181 and 182, and the control part 100. The camera 181 is an imaging unit to take an image of the concave portion 24 and the gate valve side (the transfer opening 15 side) of the wafer W, and the camera 182 is an imaging unit to take an image of the concave portion 24 and the rotational axis side (the turntable's 2 center side) of the wafer W. By providing two of the cameras 181 and 182, it is possible to take and to recognize an image about an exact height of the wafer W in the concave portion 24, that is to say, about how much the surface of the wafer W is lower than the surface of the turntable 2, in addition to whether or not the surface of the wafer W is higher the surface of the turntable 2. This makes it possible to detect whether the amount of warpage of the wafer W is likely to increase or not. In other words, by imaging and detecting the edge height of the wafer W at two locations on the gate valve side and the rotational axis side, it is determined that the amount of warpage increases when the edge height increases. The height of the wafer W may be based on the surface of the turntable 2, and may be detected based on a height difference from the surface of the turntable 2 (a distance between the surface of the turntable 2 and the surface of the wafer W in a height direction). In other words, in actual imaging and image recognition, how much the surface of the wafer W is lower than the surface of the turntable 2 is detected, based on which a variety of determination may be made.

In this manner, because two locations opposite to each other of the wafer W and the concave portion are imaged, the opening 17 and the windows 18*a* and 18*b* are formed to have a size to allow the wafer W and the concave portion 24 to be taken a wide-angle image. Furthermore, the image processing parts 191 and 192 are units to process an image taken by the cameras 181 and 182, connected to the cameras 181 and 182, respectively, and have a function similar to the image processing part 190 described in the first embodiment. In addition, the control part 100 is the same as described in the first embodiment, and each of the image processing parts 191 and 192 is connected to the control part 100.

Figure 13A:
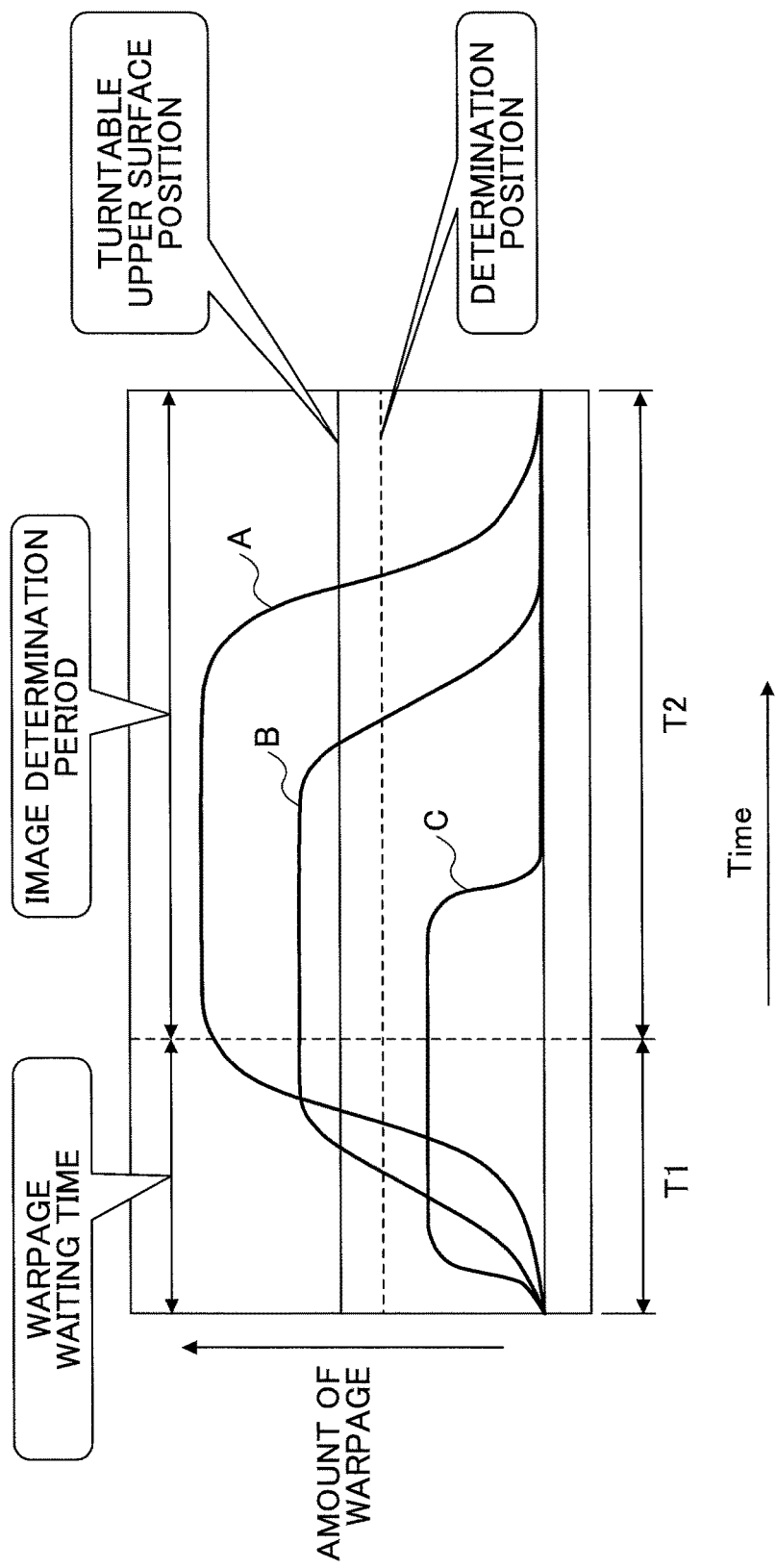
FIGS. 13A and 13B are drawings for explaining an example of time course characteristics of an amount of warpage of a wafer and a method of detecting a ready for rotation state performed by the ready for rotation state detection device according to the second embodiment of the present invention.
Figure 13B:
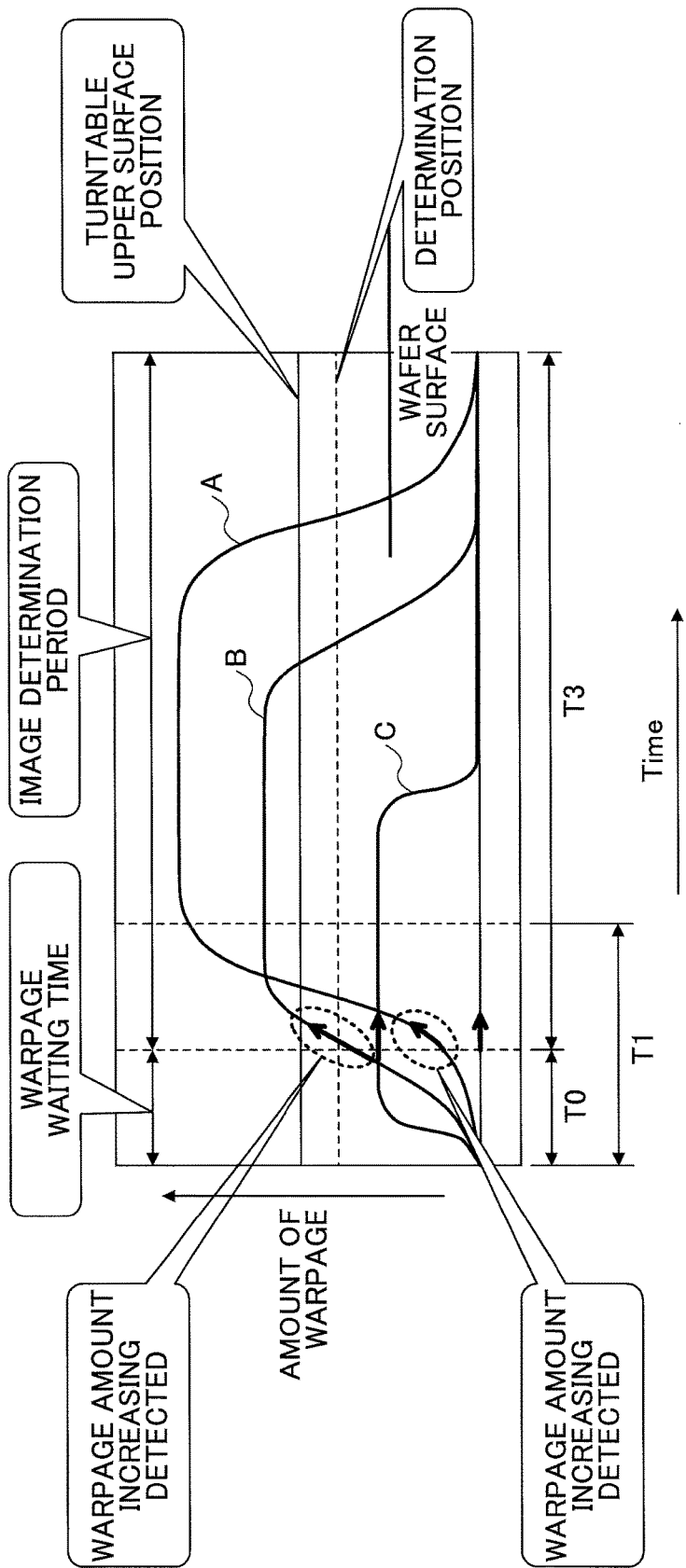

FIGS. 13A and 13B are drawings for explaining an example of time passage characteristics of the warpage of the wafer W and a method of detecting a ready for rotation state performed by the ready for rotation state detection device 201 of the second embodiment.

FIG. 13A is a drawing illustrating an example of the time passage characteristics of the amount of warpage of the wafer W. FIG. 13A illustrates warpage amount time passage characteristics of three wafers A, B and C, providing a transverse axis as time and a longitudinal axis as an amount of warpage. The wafer A has the greatest warpage amount and the warpage waiting time; the wafer B has the second greatest warpage amount and the warpage waiting time; and the wafer C has the smallest warpage amount and the warpage waiting time. In this case, in the method of detecting the ready for rotation state using the ready for rotation state detection device 200, the warpage waiting time has to be adapted to the wafer A having the greatest warpage amount in terms of safety, and the warpage waiting time T1 has to be set at the warpage waiting time of the wafer A requiring the longest warpage waiting time. Hence, an image determination period T2 follows after the warpage waiting time T1 has passed. For example, the warpage waiting time is set at 20 seconds, and the sequence is set to start the ready for rotation state detection after 20 seconds have passed.

FIG. 13B is a drawing for explaining the method of detecting the ready for rotation state performed by the ready for rotation state detection device 201 of the second embodiment. In FIG. 13B, the warpage waiting time T0 is set shorter than the warpage waiting time T1 described in FIG. 13A. In the ready for rotation state detection device 201 of the second embodiment, for example, the warpage waiting time T0 may be set at about one-half of the warpage waiting time T1, and the warpage waiting time T0 may be set at 10 seconds or shorter when the warpage waiting time T1 is 20 seconds.

The image determination starts after the shortened warpage waiting time T0 has passed. In the example of FIG. 13B, the amounts of warpage of the wafers A and B are increasing during the warpage waiting time T0, but the amount of warpage of the wafer C does not change. In such a case, it is determined that the amounts of warpage of the wafers A and B are increasing, but the amount of warpage of the wafer C is not increasing, and further determined whether the surface of the wafer C is lower than the predetermined height, with respect to the wafer C that is determined that the amount of warpage thereof is not increasing.

In the example of FIG. 13B, because the height of the surface of the wafer C is lower than a determination location, it is determined that the warpage of the wafer C subsides and the wafer C is in the ready for rotation state, and the process is moved to the ready for rotation state detection for the next wafer W. Thus, the ready for rotation state of the wafer C can be detected by spending the time shorter than the warpage waiting time T1, by which the time required for the whole ready for rotation state detection determination can be reduced. In addition, by shortening the warpage waiting time T0, the image determination period T3 naturally becomes longer than the image determination period T2 illustrated in FIG. 13A.

Figure 14:
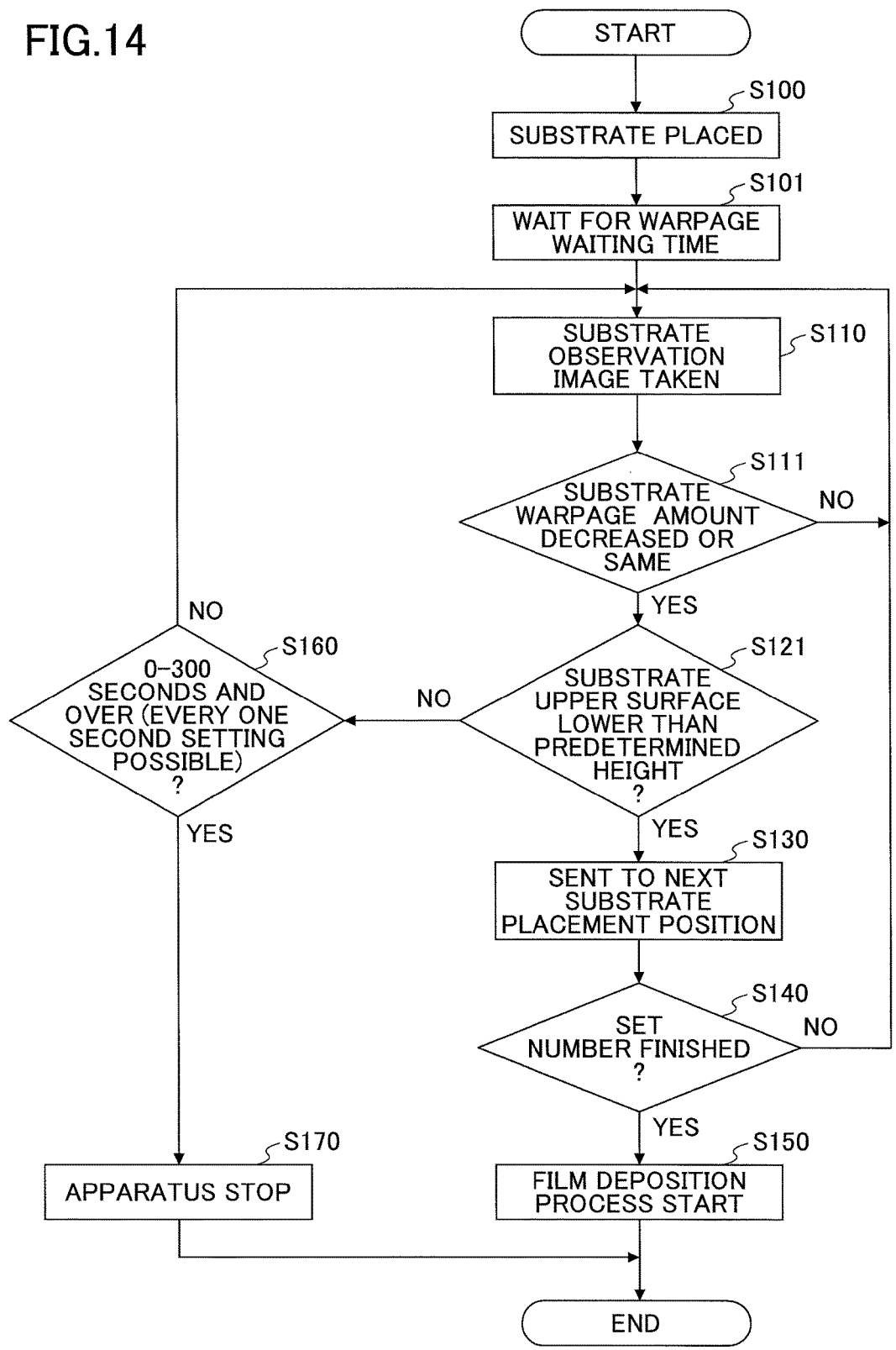
FIG. 14 is a chart illustrating an example of a process flow of the method of detecting the ready for rotation state implemented by the ready for rotation state detection device according to the second embodiment of the present invention.

FIG. 14 is a flowchart illustrating an example of a processing flow of the method of detecting the ready for rotation state performed by the ready for rotation state detection device 201 of the second embodiment. In FIG. 14, the same step number is attached to a process similar to that in the processing flow of the method of detecting the ready for rotation state of the first embodiment illustrated in FIG. 10, and the description is simplified or omitted.

In step S100, the wafer W is placed on the concave portion 24 formed in the surface of the turntable 2. The wafer W gradually starts to warp.

In step S101, the process keeps waiting during the warpage waiting time of the wafer W. Here, the warpage waiting time is set shorter than the warpage waiting time when the wafer W reaches the maximum warpage amount, for example, about half of the maximum warpage amount. Here, instruction of waiting is performed by the image processing parts 191 and 192 or by the control part 100.

In step S110, taking a substrate observation image starts by using the cameras 181 and 182. Since this step is similar to FIG. 10, the detailed description is omitted.

In step S111, the image processing parts 191 and 192 determine whether the amount of warpage of the wafer W reduces, or does not change or not. In other words, the image processing parts 191 and 192 determine whether the amount of warpage of the wafer W is increasing or not. When the image processing parts 191 and 192 determine that the amount of warpage of the wafer W is increasing, the process returns to step S110, and repeats the processing flow from step S110. In contrast, when the image processing parts 191 and 192 determine that the amount of warpage is not increasing, the process advances to step S121.

In step S121, the image processing parts 191 and 192 determine whether the height of the upper surface of the wafer W is a predetermined height (a predetermined value) or lower. When the image processing parts 191 and 192 determines that the height of the upper surface of the wafer W is equal to or lower than the predetermined height, which means that the warpage of the wafer W is not increasing and the upper surface of the wafer W fits in the depth of the concave portion 24 of the turntable 2, it is determined that the wafer is in the ready for rotation state. Then, the process goes to step S130, and the object to be detected is shift to a placement position of the next wafer W.

Here, in step S121, the height of the wafer W does not have to be the same as the surface of the turntable 2, but may be lower than the surface of the turntable 2 in terms of further safety. Because the cameras 181 and 182 can recognize the surface height of the wafer W, more accurate determination is possible.

Since steps S130 through S170 are similar to those in the processing flow in FIG. 10, the same step numbers are attached to the steps and the description is omitted.

In this manner, the ready for rotation state detection device 201 and the method of detecting the ready for rotation state of the second embodiment can accelerate the ready for rotation state detection starting time, and can reduce the whole ready for rotation state detection time.

In the present embodiment, a description is given below of an example of detecting the surface height of the wafer W by using two of the cameras 181 and 182, but a configuration of using a single camera 180 as illustrated in the first embodiment is possible as long as the utilized camera 180 is made wide-angle and can detect the surface height of the wafer over a wide range. On the contrary, increasing the number of the cameras 181 and 182 is possible to detect the surface height of the wafer W more precisely. The ready for rotation state detection device 201 of the second embodiment can take a variety of configuration as long as the ready for rotation state detection device 201 can detect a changing state of the amount of warpage of the wafer W and the surface height of the wafer W, and can determine the ready for rotation state based thereon.

[Third Embodiment]

FIGS. 15A and 15B are drawings illustrating an example of a ready for rotation state detection device according to a third embodiment of the present invention. The ready for rotation state detection device 202 of the third embodiment differs from the ready for rotation state detection device 200 of the first embodiment in that a ready for rotation state detection unit is configured by using a transmission type optical detector instead of the camera 180 and the image processing part 190. Since the other components are similar to those in the ready for rotation state detection device 200 of the first embodiment, the description is omitted by attaching the same numerals to the similar components.

FIG. 15A is a drawing illustrating that a wafer W is placed on the concave portion 24 of the turntable 2 and warps thereon. FIG. 15A illustrates a projector 183 and an optical receiver 184 arranged facing to each other and a state of the projector 183 emitting light at a height in the vicinity of the surface of the turntable 2. Here, because the wafer W warps and the end thereof is raised higher than the surface of the turntable 2, the light from the projector 183 is blocked by the end of the wafer W and does not reach the optical receiver 184. Thus, the unready for rotation state can be detected by allowing the light emitted from the projector toward the neighborhood of the end of the concave portion 24 to be blocked by the wafer W.

FIG. 15B is a drawing illustrating a state in which the warpage of the wafer W subsides and the wafer W fits in the concave portion 24. Because the warpage of the wafer W subsides and the end of the wafer W is located lower than the surface of the turntable 2, the light emitted from the projector 183 passes over the concave portion 24 without being blocked and enters the opposite optical receiver 184. In this manner, the ready for rotation state can be detected based on the event that the light emitted from the projector 183 toward the optical receiver 184 has entered the optical receiver 184 without being blocked by the wafer W.

Thus, in the ready for rotation state detection device 202 of the third embodiment, by using the optical detector composed of a pair of the projector 183 and the optical receiver 184 as a ready for rotation state detection unit, the ready for rotation state of the wafer W can be detected by a simple configuration.

The projector 183 and the optical receiver 184 are arranged to face each other. Although the installation height thereof can be set at a predetermined height so that an optical path of the emitted/incident light becomes a predetermined height leaving a predetermined space (value) from the surface of the turntable 2, the predetermined space (value) can be made approximately zero by setting a minute gap that does not bring the light into contact with the surface of the turntable 2.

Moreover, when applying the ready for rotation state detection device 202 of the third embodiment including the projector 183 and the optical receiver 184 to the substrate processing apparatus 210 illustrated in the first embodiment, by providing another window at a location opposite to the window 18 and by arranging the projector 183 and the optical receiver 184 outside the pair of opposite windows, whether the wafer W warps or not can be detected from the outside of the chamber 1. By taking such a configuration, a substrate processing apparatus of the third embodiment can be configured.

Furthermore, in the ready for rotation state detection device 202 of the third embodiment, the image processing part 190 is unnecessary, and a state signal is directly input to the control part 100 from the optical receiver 184. More specifically, when the optical receiver 184 receives the light from the projector 183, the optical receiver 184 just has to output the state signal indicating that the turntable 2 is in a ready for rotation state and just has to send the state signal to the control part 100.

In addition, in the processing flow in FIG. 10, the method of detecting the ready for rotation state and the method of processing substrate of the third embodiment just have to change the process of taking an image of the wafer W in step S110 into a process of outputting light from the projector 183. With respect to the other steps, the method of detecting the ready for rotation state and the method of processing the substrate of the third embodiment can be implemented by using the processing flow illustrated in FIG. 10 similarly.

In this manner, according to the ready for rotation state detection device 202, the substrate processing apparatus, the method of detecting a ready for rotation state and the method of processing a substrate using the same of the third embodiment, the state ready to start rotating can be detected certainly and promptly by a simple configuration using a pair of optical detector of low costs.

[Fourth Embodiment]

FIGS. 16A and 16B are drawings illustrating an example of a ready for rotation state detection device according to a fourth embodiment of the present invention. The ready for rotation state detection device 203 of the fourth embodiment differs from the ready for rotation state detection device 200 of the first embodiment in that a ready for rotation state detection unit is configured by using a reflective optical detector instead of the camera 180 and the image processing part 190. Since the other components are similar to those of the ready for rotation state detection device of the first embodiment, the description is omitted by attaching the same numerals to the similar components.

FIG. 16A is a drawing illustrating that a wafer W is placed on the concave portion 24 of the turntable 2 and warps thereon. In FIG. 16A, a reflective optical sensor 185 is arranged on a lateral side of the turntable 2 at a height around the surface of the turntable 2, and the reflective optical sensor 185 emits light at the height around the surface of the turntable 2. Here, because the wafer W warps and the end thereof is raised higher than the surface of the turntable 2, the light emitted from the reflective optical sensor 185 is reflected by the end of the wafer W, and the reflected light enters the reflective optical sensor 185. Thus, an unready for rotation state can be detected by allowing the light emitted from the reflective optical sensor 185 toward the neighborhood of the end of the concave portion 24 to be reflected from the end having warped upward (protrusion part) of the wafer W.

FIG. 16B is a drawing illustrating that the warpage of the wafer W subsides and the wafer W fits in the concave portion 24. Because the warpage of the wafer W subsides and the end of the wafer W is located lower than the surface of the turntable 2, the light emitted from the reflective optical sensor 185 passes over the concave portion 24 without being reflected, and the reflective optical sensor 185 cannot receive the reflected light. In this manner, the ready for rotation state can be detected based on the event that the light emitted from the reflective optical sensor 185 toward a location slightly above the concave portion 24 of the turntable and the reflective optical sensor 185 does not receive the reflected light.

Thus, in the ready for rotation state detection device 203 of the fourth embodiment, by using the reflective optical sensor 185 that is one of the optical detectors as the ready for rotation state detection unit, the ready for rotation state of the wafer W can be detected by an extremely simple configuration.

Although the reflective optical sensor 185 is arranged so that the light passes over the concave portion 24 in the vicinity of the surface of the turntable 2, the installation height can be set at a predetermined height leaving a predetermined space (value) from the surface of the turntable 2. Moreover, by setting the installation height of the reflective optical sensor 185 at a quite-short distance so as not to bring the emitted light into contact with the surface of the turntable 2, the predetermined space can be made approximately zero.

Furthermore, when the ready for rotation state detection device 203 of the third embodiment is applied to the substrate processing apparatus 210 illustrated in the first embodiment, by utilizing the widow 18 as it is and by arranging the reflective optical sensor 185 at a location similar to the arrangement location of the camera 180, whether the wafer W warps or not can be detected from the outside of the chamber 1. By adopting such a structure, a substrate processing apparatus of the fourth embodiment can be configured.

In addition, even in the ready for rotation state detection device 203 of the forth embodiment, the image processing part 190 becomes unnecessary as well as the ready for rotation state detection device of the third embodiment, and a state signal is directly input to the control part 100 from the reflective optical sensor 185. More specifically, when receiving the reflected light from the wafer W, the reflective optical sensor 185 outputs a state signal indicating that the turntable 2 is in an unready for rotation state, and when the reflective optical sensor 185 goes into a state of not receiving the reflected light from the wafer W, the reflective optical sensor 185 just has to send a state signal indicating that the turntable 2 is in a ready for rotation state.

Moreover, the method of detecting the ready for rotation state and the method of processing the substrate of the forth embodiment can be implemented by changing from the step of taking an image of the wafer W in step S110 in the processing flow illustrated in FIG. 10 into a step of emitting light from the reflective optical sensor 185. With respect to the other steps, the method of detecting the ready for rotation state and the method of processing the substrate of the forth embodiment can be implemented by performing the steps similar to the processing flow illustrated in FIG. 10.

In this manner, according to the ready for rotation state detection device 202, the substrate processing apparatus, the method of detecting the ready for rotation state and the method of processing the substrate using the same of the fourth embodiment, the state ready to start rotating can be certainly and promptly detected by a further simple configuration using a single reflective optical detector of low costs.

[Fifth Embodiment]

FIGS. 17A and 17B are drawings illustrating an example of a ready for rotation state detection device of a fifth embodiment of the present invention. The ready for rotation state detection device 203 of the fifth embodiment differs from the ready for rotation state detection devices 200 through 203 of the first through third embodiments in that a ready for rotation state detection unit is configured by using an interferometer 141 provided above the chamber 1 instead of the ready for rotation state detection unit provided on the lateral side of the chamber 1. Here, since the other components are similar to those in the rotatable detection device 200 of the first embodiment, the description is omitted by attaching the same numerals to similar components.

FIG. 17A is a drawing illustrating a state of a wafer W placed on the concave portion 24 and warping thereon. In FIG. 17A, the interferometer 141 is arranged above the turntable 2, and irradiates the surface of the end of the wafer W placed on the concave portion 24 with light. Here, FIG. 17A illustrates an image 143 imaging interference fringes 142 formed by the interferometer 141, in which pitches between the interference fringes 142 vary depending on change of a curvature of a curve because the wafer W warps and the end thereof is curved. This makes it possible to detect the warping state of the wafer W, and that the wafer W protrudes from the concave portion 24 and becomes higher than the surface of the wafer W based on the detected amount of warpage, and that the wafer W is in the unready for rotation state. Thus, the unready for rotation state can be detected by imaging the interference fringes 142 by using the interferometer 141.

FIG. 17B is a drawing illustrating a state of the warpage of the wafer subsided and fitted in the concave portions. Because the warpage of the wafer W subsides and the curvature of the end of the wafer W disappears, an image 143 in which the inference fringes 142 by the interferometer have disappeared is taken. In this manner, the ready for rotation state can be detected based on the disappearance of the interference fringes by the interferometer 141. Here, although FIG. 17B illustrates that the interference fringes 142 have completely disappeared for ease in understanding, the interference fringes 142 do not have to completely disappear because the curvature of the wafer W becomes a predetermined amount or less and the ready for rotation state just has to be detected even if the interference fringes 142 do not completely disappear. In other words, it is only necessary to preliminarily understand that the height of the surface of the wafer end becomes the predetermined value or less and the wafer W does not fly out even if the turntable 2 is rotated, in what way the interference fringes 142 becomes after the interference fringes 142 decreases. This makes it possible to understand the amount of warpage of the wafer W and the height of the wafer end and to detect the ready for rotation state.

Because the interferometer 141 is installed above the turntable 2, the interferometer 141 can be provided in the substrate position detection device 170, and the existing window 110 can be utilized as it is. Moreover, by providing the interferometer 141 in the substrate position detection device 170, a substrate processing apparatus using the ready for rotation state detection device 204 of the fifth embodiment can be configured. In this case, the image processing of the image 143 based on the interference fringes 142 may be performed at a processing part 160 in the substrate position detection device 170, and the state signal indicating whether the wafer W is in the ready for rotation state may be sent control part 100.

Thus, in the ready for rotation state detection device 204 of the fifth embodiment, by using the interferometer 141 as the ready for rotation state detection unit, the substrate processing apparatus can be configured in a form of the existing substrate position detection device 170 including the ready for rotation state detection unit of the interferometer 141, and the ready for rotation state of the wafer W can be detected.

Moreover, a method of detecting the ready for rotation state and a method of processing the substrate can be implemented by changing the step of taking an image of the wafer W in step S110 in the processing flow illustrated in FIG. 10 to a step of taking an image 143 of the image 143 of the interference fringes 142 by the interferometer 141. With respect to the other steps, the method of detecting the ready for rotation state and the method of processing the substrate can be implemented by performing the steps similar to the professing flow illustrated in FIG. 10.

In this manner, according to the ready for rotation state detection device 204, the substrate processing apparatus, the method of detecting the ready for rotation state and the method of detecting the substrate using the same, the state ready to start rotating can be certainly and promptly detected by a simple configuration incorporating the ready for rotation state detection device into the existing substrate position detection device 170.

Furthermore, because the interferometer 141 can accurately measure the surface height of the wafer W in many cases, the method of detecting the ready for rotation state 204 of the fifth embodiment can be combined with the method of the ready for rotation state 204 of the second embodiment by using such an interferometer. In other words, the process in FIGS. 13B and 14 described in the second embodiment can be performed by using the ready for rotation state detection device 204 of the fifth embodiment.

According to embodiments of the present invention, there is provided a ready for rotation state detection device, a method of detecting a ready for rotation state and a substrate processing apparatus capable of detecting that a wafer goes into a state in which the wafer on the turntable cannot fly out even if the turntable is rotated.

All examples recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority or inferiority of the invention.

What is claimed is:

1. A ready for rotation state detection device configured to detect a state in which a substrate, which is placed on a concave portion formed in a top surface of a turntable and warps so that an edge portion of the substrate becomes higher than a central portion of the substrate upon being placed on the concave portion, will not fly out of the concave portion when the turntable is rotated, the turntable being provided in a chamber, the ready for rotation state detection device comprising:
   an imaging unit configured to take an image of an edge of the concave portion from a lateral side and to detect a height of a highest location of the edge portion of the substrate relative to the top surface of the turntable by imaging;
   an image processing unit configured to determine, from the image taken by the imaging unit, that the highest location of the edge portion of the substrate is a first height that is higher than a predetermined value indicating that the turntable is not ready to start rotating, or a second height that is lower than or equal to the predetermined value indicating that the turntable is ready to start rotating, upon receiving the substrate on the concave portion, and to output either a first signal indicating that the turntable is not ready to start rotating upon determining that the highest location of the edge portion of the substrate is the first height, or a second signal indicating that the turntable is ready to start rotating upon determining that the highest location of the edge portion of the substrate is the second height; and
   a controller configured not to rotate the turntable upon receiving the first signal from the image processing unit and to rotate the turntable upon receiving the second signal from the image processing unit.

2. The ready for rotation state detection device as claimed in claim 1, wherein the predetermined value is a same predetermined height as the surface of the turntable or lower.

3. The ready for rotation state detection device as claimed in claim 1, wherein the imaging unit can take an image of a plurality of locations of the surface of the edge portion of the substrate.

4. The ready for rotation state detection device as claimed in claim 3, wherein the imaging unit includes a plurality of sub-imaging units configured to take an image of each surface of the edge portion of the substrate of the plurality of locations, respectively.

5. The ready for rotation state detection device as claimed in claim 2, wherein the imaging processing unit determines whether the height of the surface of the edge portion of the substrate is increasing or not, and determines that the turntable is ready to start rotating when determining that the height of the surface of the edge portion of the substrate is not increasing and equal to or lower than the predetermined value.

6. A ready for rotation state detection device configured to detect a state in which a substrate, which is placed on a concave portion formed in a top surface of a turntable and warps so that an edge portion of the substrate becomes higher than a central portion of the substrate upon being placed on the concave portion, will not fly out of the concave portion when the turntable is rotated, the turntable being provided in a chamber, the ready for rotation state detection device comprising:

a ready for rotation state detection unit configured to detect that a height of a highest location of the edge portion of the substrate relative to the top surface of the turntable changes to a first height that is equal to or lower than a predetermined value indicating that warpage of the substrate is decreased to such an extent that the turntable is ready to start rotating, from a second height that is higher than the predetermined value and indicates that the turntable is not ready to start rotating, upon receiving the substrate on the concave portion, and to output either a first signal indicating that the turntable is ready to start rotating upon determining that the highest location of the edge portion of the substrate is the first height, or a second signal indicating that the turntable is not ready to start rotating upon determining that the highest location of the edge portion of the substrate is the second height; and a controller configured not to rotate the turntable upon receiving the second signal from the image processing unit and to rotate the turntable upon receiving the first signal from the image processing unit, wherein the ready for rotation state detection unit is an optical detector configured to detect that the height of the surface of the edge portion of the substrate is equal to or lower than the predetermined value by emitting light toward a neighborhood of the edge of the concave portion and by detecting whether the light is blocked by the edge portion of the substrate.

7. The ready for rotation state detection device as claimed in claim 6, wherein the optical detector is configured to emit the light toward the neighborhood of the edge of the concave portion at a height close to the surface of the turntable from the lateral side and to detect that the height of the surface of the substrate is equal to or lower than the predetermined value based on whether the light is reflected by the edge portion of the substrate.

8. The ready for rotation state detection device as claimed in claim 6, wherein the predetermined value is a same predetermined height as the surface of the turntable or higher.

9. The ready for rotation state detection device as claimed in claim 1, wherein the image processing unit determines that the height of the surface of the edge portion of the substrate is equal to or lower than the predetermined value after a predetermined time has passed since the substrate was placed on the concave portion.

10. A substrate processing apparatus, comprising:
a chamber;
a rotatable turntable provided in the chamber and having a concave portion formed in a surface thereof to receive a substrate; and
a ready for rotation state detection device as claimed in claim 1.

11. The substrate processing apparatus as claimed in claim 10,
wherein the chamber includes a window to allow an inside of the chamber to be observed, and
the imaging unit is provided outside the chamber and detects that the height of the surface of the edge portion of the substrate is equal to or lower than the predetermined value through the window.

12. A method of detecting a ready for rotation state to detect a state in which a substrate, which is placed on a concave portion formed in a top surface of a turntable and warps so that an edge portion of the substrate becomes higher than a central portion of the substrate upon being placed on the concave portion, will not fly out of the concave portion when the turntable is rotated, the turntable being provided in a chamber, the method comprising:
taking an image of an edge of the concave portion from a lateral side;
detecting a height of a highest location of the edge portion of the substrate relative to the top surface of the turntable from the taken image;
determining by an image processing unit, from the taken image, that the highest location of the edge portion of the substrate is a first height that is higher than a predetermined value indicating that the turntable is not ready to start rotating, or a second height that is lower than or equal to the predetermined value indicating that the turntable is ready to start rotating, upon receiving the substrate on the concave portion;
outputting by the image processing unit, either a first signal indicating that the turntable is not ready to start rotating upon determining that the highest location of the edge portion of the substrate is the first height, or a second signal indicating that the turntable is ready to start rotating upon determining that the highest location of the edge portion of the substrate is the second height;
causing the turntable not to rotate, by a controller, upon receiving the first signal from the image processing unit; and
causing the turntable, by the controller, upon receiving the second signal from the image processing unit.

13. The method as claimed in claim 12, wherein the predetermined value is a same predetermined height as the surface of the turntable or lower.

14. The method as claimed in claim 12,
wherein a plurality of concave portions is formed in the surface of the turntable in addition to the concave portion, and
the steps of taking an image of an edge of the concave portion and detecting that the height of the highest location of the edge portion of the substrate are performed in series for a plurality of substrates placed on the plurality of concave portions.

15. The method as claimed in claim 12, further comprising:
outputting an alarm signal upon detecting the first signal output from the image processing unit by the controller.

* * * * *